United States Patent
Ogusu et al.

[11] Patent Number: 5,917,625
[45] Date of Patent: Jun. 29, 1999

[54] HIGH RESOLUTION OPTICAL MULTIPLEXING AND DEMULTIPLEXING DEVICE IN OPTICAL COMMUNICATION SYSTEM

[75] Inventors: Masahiro Ogusu, Tokyo; Shigeru Oshima, Kanagawa-ken, both of Japan

[73] Assignee: Kabushiki Kaisha Toshiba, Kanagawa-ken, Japan

[21] Appl. No.: 08/804,344

[22] Filed: Feb. 21, 1997

Related U.S. Application Data

[63] Continuation of application No. 08/301,987, Sep. 9, 1994, abandoned.

[30] Foreign Application Priority Data

Sep. 9, 1993 [JP] Japan .................................. 5-224116
Jun. 23, 1994 [JP] Japan .................................. 6-141595

[51] Int. Cl.[6] .............................. H04J 14/02; G02B 6/10
[52] U.S. Cl. ........................ 359/130; 385/132; 359/124
[58] Field of Search .................. 359/114–115, 127–131; 385/129, 131, 132, 49, 24, 35, 37

[56] References Cited

U.S. PATENT DOCUMENTS

| | | | |
|---|---|---|---|
| 4,744,618 | 5/1988 | Mahlein .................................. | 359/129 |
| 5,109,464 | 4/1992 | Munowitz .............................. | 385/132 |
| 5,143,577 | 9/1992 | Haas et al. ............................. | 385/132 |
| 5,202,938 | 4/1993 | Man et al. .............................. | 385/132 |
| 5,206,920 | 4/1993 | Cremer et al. ......................... | 385/132 |
| 5,210,801 | 5/1993 | Fournier et al. ........................ | 385/132 |
| 5,243,677 | 9/1993 | Kanamori et al. ..................... | 385/131 |
| 5,265,184 | 11/1993 | Lebby et al. ............................ | 385/132 |
| 5,387,269 | 2/1995 | Nijunder et al. ........................ | 385/132 |

OTHER PUBLICATIONS

Lipson et al., "A Six–Channel Wavelength Multiplexer and Demultiplexer for Single Mode Systems", J. Lightwave Tech., vol. LT–3, No. 5, Oct. 1985, pp. 1159–1163.

Teiichi Shimomura, "A Multi–Press Spectrometer", Japanese Journal of Applied Physics, vol. 3, No. 8, Aug. 1964, pp.459–470.

*Primary Examiner*—Leo H. Boudreau
*Assistant Examiner*—Bhavesh Mehta
*Attorney, Agent, or Firm*—Foley & Lardner

[57] ABSTRACT

An optical multiplexing and demultiplexing device of a type using a lens and a diffraction grating, which incorporates a waveguide array having waveguide channels with narrow spacings for facilitating high resolution, where the narrow spacings are realized by forming an etching groove between each adjacent waveguide channels and providing a measure for preventing optical coupling among the waveguide channels in the form of an air gap, or a layer having a refractive index lower than a cladding layer, or a layer for absorbing/reflecting light, which is provided in the etching groove. The device also incorporates a reflection mirror for reflecting the initially diffracted lights from the diffraction grating back to the diffraction grating, such that the diffracting grating diffracts the diffracted lights reflected back from the reflection mirror again to produce wavelength division multiplexed/demultiplexed optical signals in high resolution.

7 Claims, 23 Drawing Sheets

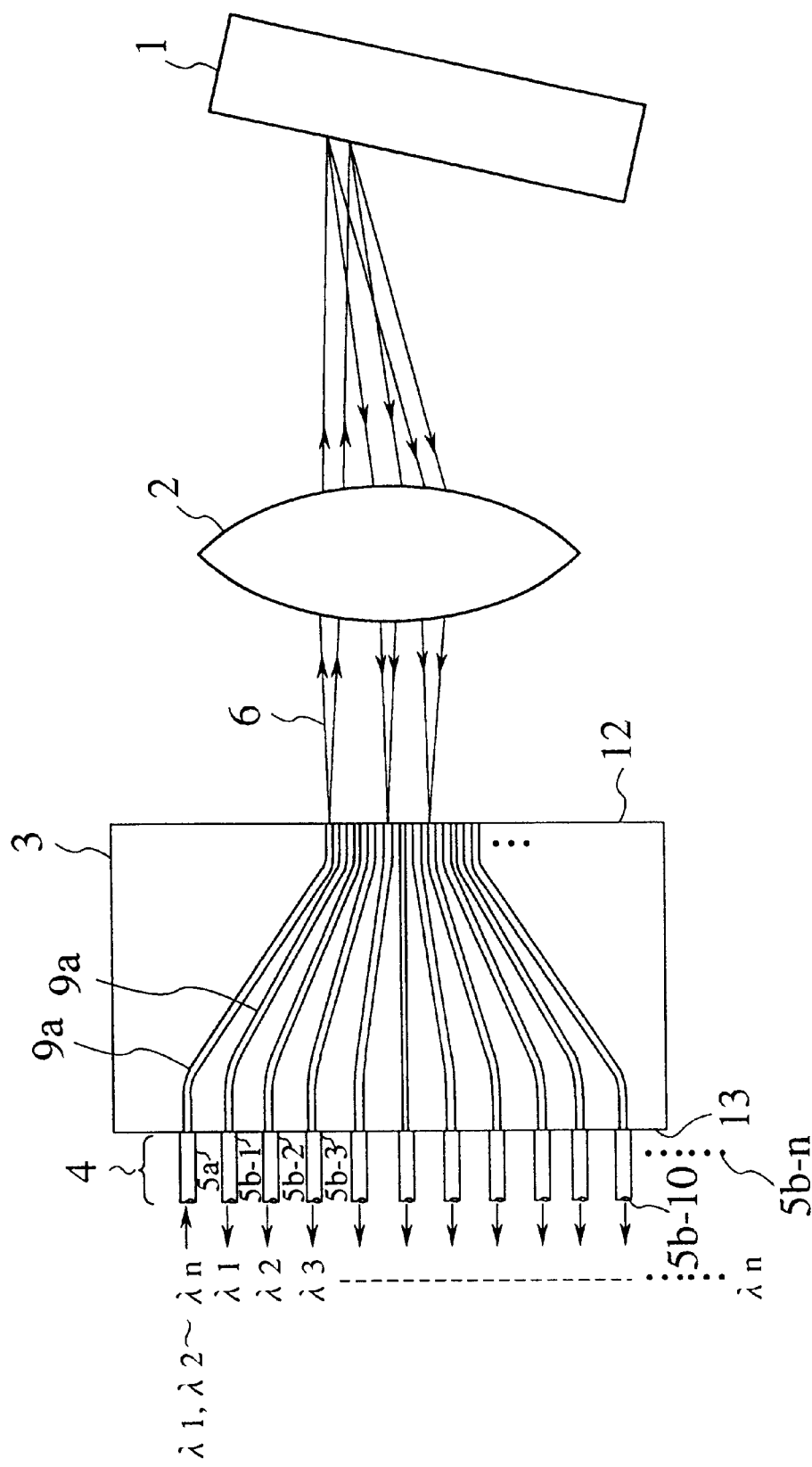

HIGH RESOLUTION OPTICAL MULTIPLEXING AND DEMULTIPLEXING DEVICE IN OPTICAL COMMUNICATION SYSTEM

This application is a continuation of application Ser. No. 08/301,987, filed Sep. 9, 1994, now abandoned.

BACKGROUND OF THE INVENTION

1. Field of the Invention

The present invention relates to an optical multiplexing and demultiplexing device of diffraction grating type which is used in a wavelength division multiplexing optical communication system.

2. Description of the Background Art

Due to the superior properties of the optical signal transmission concerning the transmission speed, the signal interference, etc. in comparison to the electric signal transmission, the optical communication techniques have been studied very actively, and in recent years, the wavelength division multiplexing optical transmission for handling the multi-channel wavelength division multiplexed optical signals has been attracting attentions.

Namely, the wavelength division multiplexing optical transmission is a transmission scheme suitable for the long distance, large capacity data communication, and it can be expected that the highly flexible transmission system or network can be constructed by providing meats for multiplexing and demultiplexing the wavelength division multiplexed optical signals.

In the wavelength division multiplexing optical transmission system, the indispensable elements includes the stabilization of the oscillation wavelength of the light source, the highly reliable optical multiplexing device for multiplexing a plurality of optical signals with different wavelengths into the optical fiber at low loss, and the highly reliable optical demultiplexing device for separating the optical signal in each wavelength from the wavelength division multiplexed optical signals and leading it to the optical receiver device. Here, the functions of multiplexing and demultiplexing can be provided by a single device in a form of an optical multiplexing and demultiplexing device.

Moreover, in the high density wavelength division multiplexing communication, it is indispensable for the optical multiplexing and demultiplexing device to have the multiplexing/demultiplexing characteristic of high resolution. In particular, in a case of realizing the wavelength division multiplexing by using optical amplifiers, in order to set up as many wavelengths as possible within the limited bandwidth of the optical amplifiers, it is necessary to improve the resolution of the optical multiplexing and demultiplexing device further.

Among the conventionally available devices, the most promising one is the optical multiplexing and demultiplexing device of the type in which the optical signals diffracted at the angles in accordance with their wavelengths are passed through optical elements such as lenses such that the dispersion of wavelengths are converted into the dispersion of positions.

A well known example of this type of the optical multiplexing and demultiplexing device is the Littrow type optical multiplexing and demultiplexing device shown in FIG. 1, which comprises a reflective diffraction grating 45, a lens 46, titanium diffused lithium niobate ($LiNbO_3$) waveguide array 47.

In this Littrow type optical multiplexing and demultiplexing device, the wavelength division multiplexed optical signals 48-1 emitted from the uppermost waveguide channel in the waveguide array 47 are collimated by the lens 46 and lead to the diffraction grating 45 at which the optical signals are diffracted by diffraction angles in accordance with their wavelengths. Then, these diffracted optical signals are passed through the lens 46 again such that the optical signals of different wavelengths are collimated to different waveguide channels in the waveguide array 47 and outputted as the wavelength division demultiplexed optical signals 48.

Here, the resolution of the optical multiplexing and demultiplexing device is determined by the the pitch of the diffraction grating 45, the focal length of the lens 46, and the waveguide channel spacing of the waveguide array. In a case of the optical multiplexing and demultiplexing device using the titanium diffused lithium niobate waveguide array, this resolution has been 2 nm at best and for this reason there has been a limit to a number of channels that can be the wavelength division multiplexed.

On the other hand, when the density of the wavelength division multiplexing is raised, it becomes necessary to stabilize the oscillation wavelength of the light source, and the conventional available wavelength stabilization technique has been that which stabilizes the wavelength to the comb shaped resonant wavelengths of the Fabry-Pérot resonator. However, in this conventional wavelength stabilization technique, the device size becomes very large.

In addition, there has been a problem that the stabilized wavelength may not necessarily coincide with the transmission wavelength of the optical multiplexing and demultiplexing device.

Moreover, in a case of the long distance transmission using the optical amplifiers, there has been a further problem that the transmission distance is going to be limited by the irregularity of the noises or the gains of the optical amplifiers.

It is also possible to form the above described Littrow type optical multiplexing and demultiplexing device using an optical fiber array as shown in FIG. 2, which comprises an optical fiber array 74 formed by arraying a plurality of optical fibers $74_B$, a lens 71 for collimating wavelength division multiplexed optical signals 70 emitted from each channel of this optical fiber array 74, and a diffraction grating 72 for diffracting the collimated wavelength division multiplexed optical signals 70 at the diffraction angles corresponding to their wavelengths so as to generate the optical signals 73 which are separated in wavelengths. Then, these diffracted optical signals 73 are passed through the lens 71 again such that the optical signals of different wavelengths are collimated to different optical fibers in the optical fiber array 74.

Another well known example of this type of the optical multiplexing and demultiplexing device is the Czerny-Turner type optical multiplexing and demultiplexing device shown in FIG. 3, which comprises an optical fiber $74_B$, a first lens $71_i$ for collimating the wavelength division multiplexed optical signals 70 emitted from the optical fiber $74_B$, a diffraction grating 72 for diffracting the collimated wavelength division multiplexed optical signals 70 at the diffraction angles corresponding to their wavelengths so as to generate the optical signals 73 which are separated in wavelengths, a second lens $71_2$ for collimating these diffracted optical signals 73 and leading the resulting wavelength division demultiplexed optical signals to optical fiber array 74.

Now, when the wavelength division multiplexed optical signals emitted from the optical fiber and collimated by the lens have the incident angle a at the diffraction grating, the wavelength division multiplexed, optical signals are diffracted at the diffraction angles β corresponding to their wavelengths according to the the relationship of the following equation (1):

$$\Lambda \cdot (\sin\alpha + \sin\beta) = \pm m \cdot \lambda \qquad (1)$$

where Λ is the grating period, λ is a wavelength of the optical signal, and m is an order of diffraction.

By differentiating this equation by the diffraction angle β, the dispersion relationship between the diffraction angle and the wavelength can be obtained as in the following equation (2).

$$d\lambda/d\beta = \pm \lambda \cdot \cos\beta / m \qquad (2)$$

This equation (2) shows that the difference in the wavelengths appears as the difference in diffraction angles.

In a case of the Littrow type optical multiplexing and demultiplexing device of FIG. 2, the demultiplexing function can be explained as follows. The optical signals 73 diffracted (i.e., wavelength dispersed) at different angles for different wavelengths are entered into the lens 71 again, and propagated for the focal length f of the lens 71, and coupled together on the surface of the optical fiber array 74. Here, by the operation of the lens 71, the optical signals 73 subjected to the diffraction angle dispersion are subjected to the position dispersion δ given by the following equation (3).

$$\delta = f \cdot \tan(d\beta) \approx f \cdot d\beta \qquad (3)$$

Thus, the optical signals separated in wavelengths are positionally dispersed and coupled at a surface of the optical fiber array, such that the different optical fibers are going to receive the optical signals in different wavelengths. The demultiplexing function in the Czerny-Turner type optical multiplexing and demultiplexing device can also be explained similarly in principle, except for the use of two lenses instead of just one.

Using the above equations (2) and (3), the dispersion relationship between the wavelength of the optical signal (optical wavelength) and the coupling position on the optical fiber array surface can be written as follows.

$$\delta = f \cdot m \cdot d\lambda / (\cos\beta \cdot \Lambda) \qquad (4)$$

FIG. 4 shows the transmission loss spectra for the optical multiplexing and demultiplexing device. Here, in order for the optical multiplexing and demultiplexing device using the lens and the diffraction grating to be applicable to the optical signals which are wavelength division multiplexed in high density, the optical multiplexing and demultiplexing device is required to have a high-resolution in its multiplexing and demultiplexing characteristic. From the above equation (4), it can be seen that the improvement of the resolution can be achieved by using the lens with a longer focal length f and the diffraction grating with a shorter grating period Λ.

However, when the lens with a longer focal length f is used, there arises the problem that the size of the device becomes large. In addition, there is also a problem that the coupling loss of the optical fiber and the optical signal becomes large as the aberration due to the lens on the optical fiber array surface also becomes larger. Moreover, there is also a problem of the disadvantageous temperature stability.

On the other hand, wren the diffraction grating with a shorter grating period Λ is used, there arises the problem that the polarization dependency of the diffraction efficiency at the diffraction grating becomes large. In this regard, this polarization dependency has not been a serious problem in the devices designed for the observation of the optical spectrum such as the spectroscope, because the diffracted lights are optically received only after the polarization state of the incoming lights is fixed to some specific state by using a polarizer.

However, in the optical communication system such as the wavelength division multiplexed transmission system designed for the long distance optical communication in particular, this problem of the polarization dependency is going to be a serious problem as it deteriorates the transmission and reception characteristic.

Another conventionally known scheme for realizing the high resolution is the double pass scheme which is used in the optical spectrum analyzer. This scheme operates as shown in FIG. 5, in which the optical signals obtained by wavelength division demultiplexing the wavelength division multiplexed optical signals 70 emitted from the optical fiber $74_B$ by using the lens 76 and the diffraction grating 72 are reflected back and entered into the lens 76 and the diffraction grating 72 again by means of the roof mirror (a pair of reflection mirrors) 77, so as to achieve the high resolution. In FIG. 5, there is also provided a wave plate 78 between the lens 76 and the roof mirror 77.

However, unless the optical fiber with a large core diameter or a photo-diode with a large light receiving area is available for receiving the diffracted light 75, it is quite difficult to realize the optical multiplexing and demultiplexing device with a high resolution in this scheme, for the following reasons.

First of all, the light passes through the lens 76 four times between the Input and the output, so that a problem that the aberration due to the lens becomes large.

Secondly, by providing the roof mirror, the reflected light of the roof mirror is passed through the lens 76, so that the aperture of the lens 76 must be larger for a part of the roof mirror compared with a case of the Littrow type optical multiplexing and demultiplexing device. For this reason, there arises the problem that it is difficult to make the coupling with the single mode optical fiber at low loss.

Also, when the multi-mode optical fiber with a large core diameter is used at the receiving side and in addition the length of the optical fiber is to be extended for a considerable length, the modal noise generated within the optical fiber becomes unignorable, so that it is not suitable for the long distance communication.

Thus, the double pass scheme is suitable for the application aimed at the observation of the relative strength or the signal spectrum of the optical signals as in the optical spectrum analyzer, but it is not suitable for the application to the optical multiplexing and demultiplexing device in the wavelength division multiplexing optical communication.

SUMMARY OF THE INVENTION

It is therefore an object of the present invention to provide an optical multiplexing and demultiplexing device capable of arranging the waveguide channels at sufficiently narrow spacings such that the satisfactory multiplexing and demultiplexing characteristic can be obtained with respect to the wavelength division multiplexed optical signals with narrow wavelength spacings, so as to realize the high resolution without relying on the contribution from the diffraction grating or the lens.

It is another object of the present invention to provide an optical multiplexing and demultiplexing device with improved resolution and polarization dependency characteristics.

According to one aspect of the present invention there is provided an optical multiplexing and demultiplexing device, comprising: a waveguide array for entering optical signals to be multiplexed/demultiplexed having a plurality of waveguide channels for propagating the optical signals, each adjacent waveguide channels being separated by an etching groove formed therebetween, and means provided in at least a part of the etching grooves formed among the waveguide channels for preventing optical coupling among the waveguide channels; a lens for collimating the optical signals from the waveguide array and the multiplexed/demultiplexed optical signals to the waveguide array; and a diffraction grating for diffracting the optical signals entered by the waveguide array and collimated by the lens to obtain wavelength division multiplexed/demultiplexed optical signals.

According to another aspect of the present invention there is provided a wavelength division multiplexed optical signal light source system, comprising: a plurality of lasers for generating optical signals in a plurality of different wavelengths; means for frequency modulating injection currents of lasers by a plurality of prescribed low frequency signals; an optical multiplexing and demultiplexing device for multiplexing the optical signals generated by the lasers to obtain wavelength division multiplexed optical signals to be transmitted; and wavelength stabilizing loop means for stabilizing the wavelengths of the optical signals generated by the lasers, for extracting and photo-electric converting a part of the wavelength division multiplexed optical signals obtained by the optical multiplexing and demultiplexing device, passing the photo-electric concerted part through band pass filters for selectively passing only the prescribed low frequency signals, synchronously detecting outputs of the band pass filters and the prescribed low frequency signals, and controlling the injection currents to be supplied to the lasers by synchronously detected signals, so as to control the wavelengths of the optical signals generated by the lasers to provide a minimum loss at the optical multiplexing and demultiplexing device.

According to another aspect of the present invention there is provided a wavelength division multiplexing optical signal transmission system, comprising: a transmission path for transmitting wavelength division multiplexed optical signals; a plurality of optical amplifiers provided on the transmission path for amplifying the optical signals transmitted through the transmission path; and first and second optical multiplexing and demultiplexing devices, provided on the transmission path, for demultiplexing the optical signals transmitted through the transmission path once, and multiplexing the demultiplexed optical signals again immediately and transmitting the demultiplexed and multiplexed optical signals further through the transmission path, respectively.

According to another aspect of the present invention there is provided an optical multiplexing and demultiplexing device, comprising: an optical transmission path array for transmitting optical signals, to be multiplexed/demultiplexed; collimating means for collimating the optical signals transmitted from the optical transmission path array and the multiplexed/demultiplexed optical signals transmitted to the optical transmission path array; a diffraction grating for diffracting the optical signals entered by the optical transmission path array and collimated by the collimating means to obtain first diffracted lights; and reflection means for reflecting the first diffracted lights from the diffraction grating back to the diffraction grating, such that the diffracting grating diffracts the first diffracted lights reflected back from the reflection means again to produce wavelength division multiplexed/demultiplexed optical signals to be collimated by the collimating means and outputted from the optical transmission path array.

Other features and advantages of the present invention will become apparent from the following description taken in conjunction with the accompanying drawings.

BRIEF DESCRIPTION OF THE DRAWINGS

FIG. 6 is a schematic diagram of the first embodiment of the optical multiplexing and demultiplexing device according to the present invention.

DETAILED DESCRIPTION OF THE PREFERRED EMBODIMENTS

Figure 1:
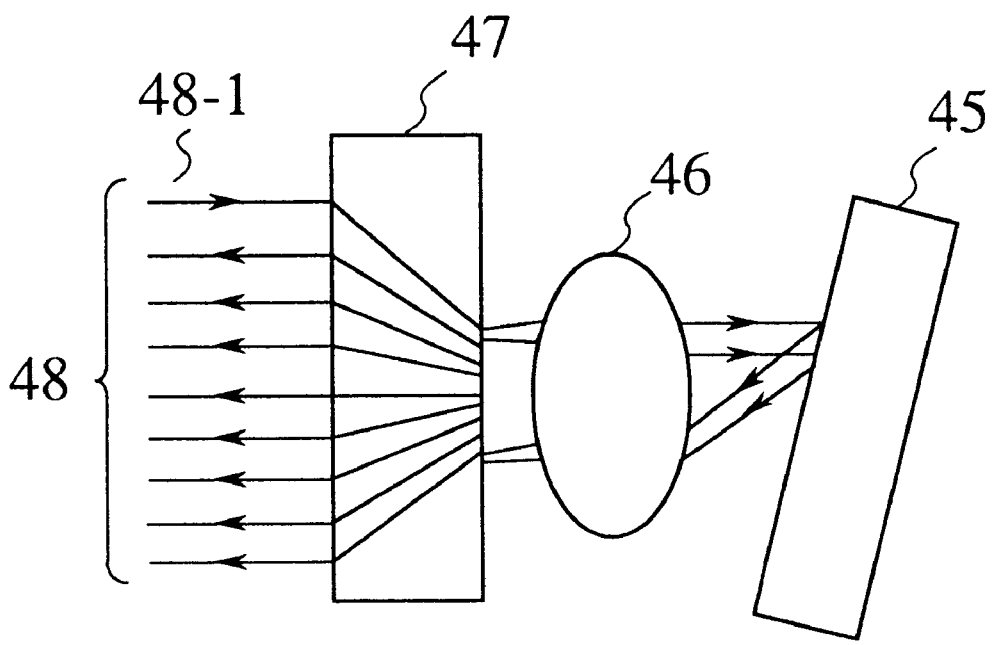
FIG. 1 is a schematic diagram of one exemplary configuration for a conventional Littrow type optical multiplexing and demultiplexing device.
Figure 2:
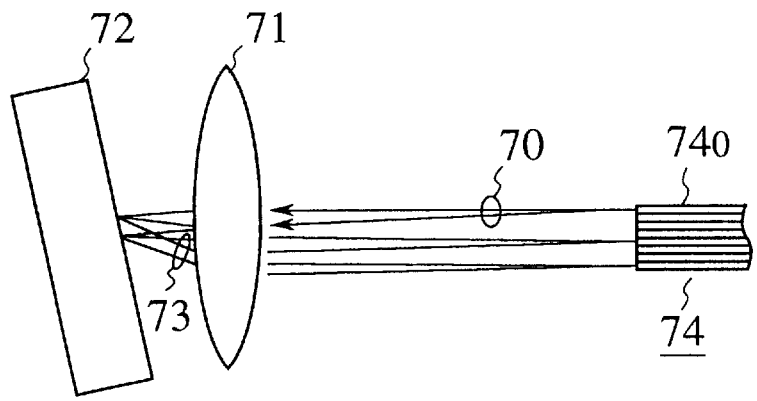
FIG. 2 is a schematic diagram of another exemplary configuration for a conventional Littrow type optical multiplexing and demultiplexing device.
Figure 3:
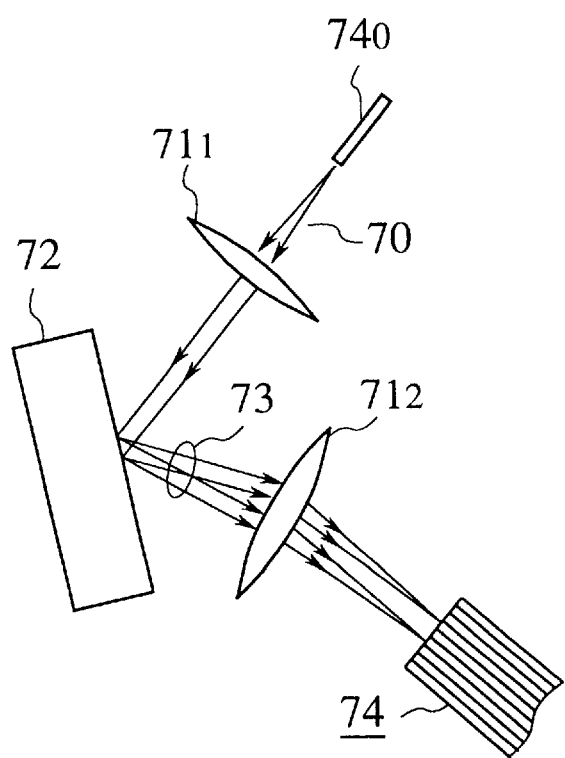
FIG. 3 is a schematic diagram of one exemplary configuration for a conventional Czerny-Turner type optical multiplexing and demultiplexing device.
Figure 4:
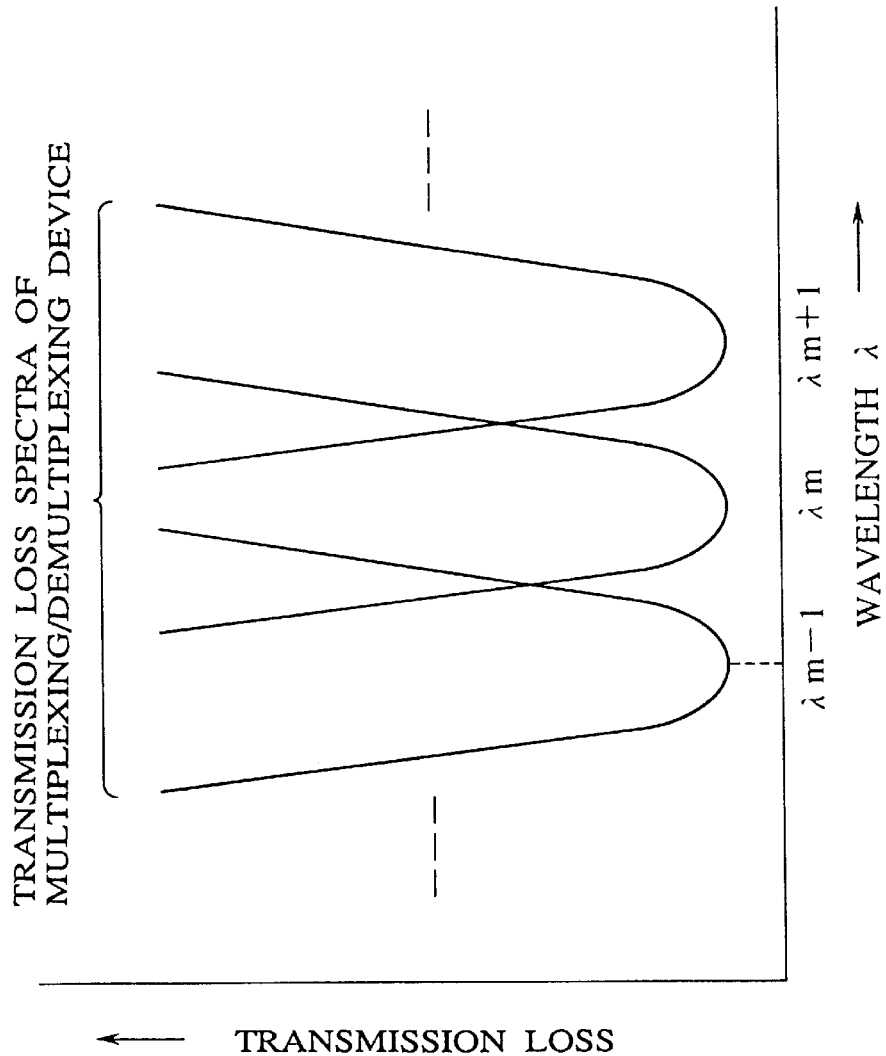
FIG. 4 is a graph of a transmission loss spectra in a conventional optical multiplexing and demultiplexing device.
Figure 5:
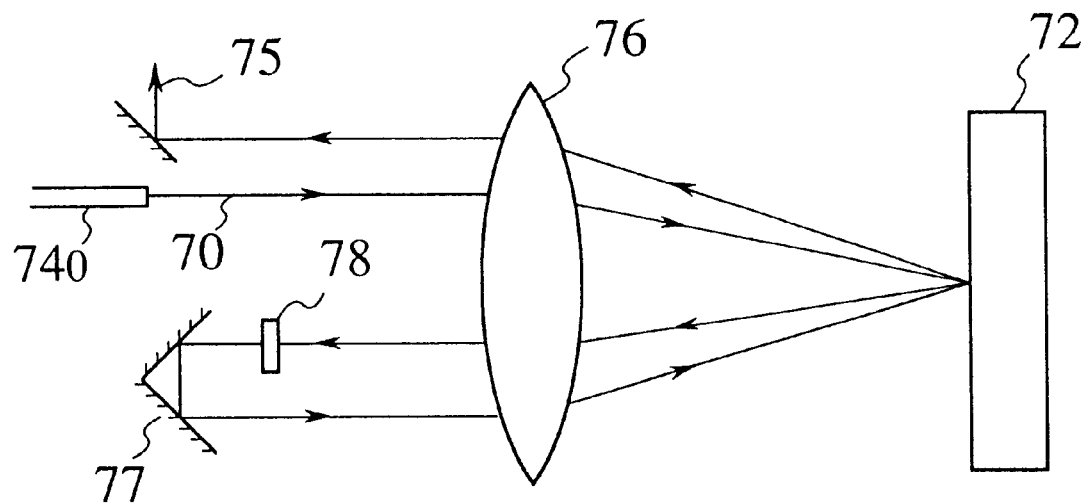
FIG. 5 is a schematic diagram of a conventional optical multiplexing and demultiplexing device for a double pass scheme.

Referring now to FIG. 6, the first embodiment of the optical multiplexing and demultiplexing device according to the present invention will be described in detail.

In this first embodiment, the optical multiplexing and demultiplexing device comprises: a diffraction grating 1, an optical lens 2, a waveguide array 3 having a plurality of waveguides 9a, and an optical fiber array 4. In this configuration, when the wavelength division multiplexed optical signals are coupled into the input optical fiber 5a in the optical fiber array 4, the wavelength division multiplexed optical signals 6 outputted from the waveguide array 3 are collimated by the lens 2 and lead to the diffraction grating 1. Then, the wavelength division multiplexed optical signals 6 are diffracted at diffraction angles according to their wavelengths, and the different wavelength components are then lead to the different waveguide channels of the waveguide array 3 coupled to different optical fibers 5b, so as to realize the demultiplexing function.

Here, by regarding the optical fiber 5a as the output port instead of the input port, and the optical fibers 5b as the input ports instead of the output ports, it can readily be understood that it is also possible to realize the multiplexing function in this configuration.

Now, one method for fabricating the waveguide array 3 used in the configuration of FIG. 8 will be described with references to FIGS. 7A to 7D.

Figure 7A:
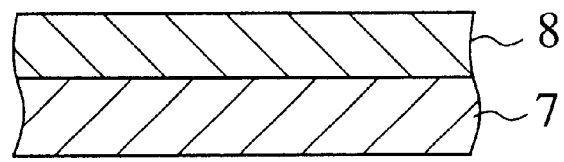
FIG. 7A to 7D are sequential illustrations of steps in one scheme for fabricating the waveguide array in the optical multiplexing and demultiplexing device of FIG. 6.

Namely, in this fabrication method, a first cladding layer 8 made of silica glass is formed on a silicon substrate 7 by the flame deposition method as shown in FIG. 7A.

Figure 7B:
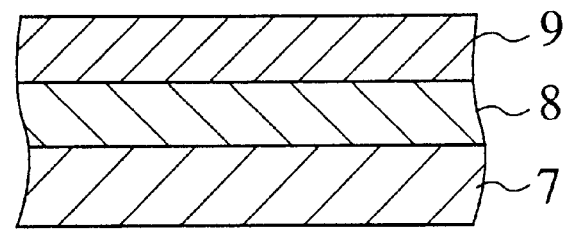

Then, an optical waveguide core, layer 9 made of silica glass doped with $TiO_2$ or GeO is formed over the first cladding layer 8 similarly by the flame deposition method as shown in FIG. 7B.

Figure 7C:
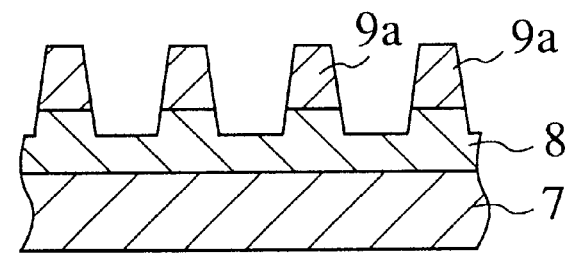

Then, the optical waveguide channels 9a are formed by applying the photolithography and the reactive ion etching on the optical waveguide layer 9 by using a suitable waveguide channel pattern as shown in FIG. 7C, so as to form a groove between each adjacent waveguide channels 9a. Here, in addition, the first cladding layer 8 located between adjacent waveguide channels 9a is also etched to form a part of each groove.

Figure 7D:
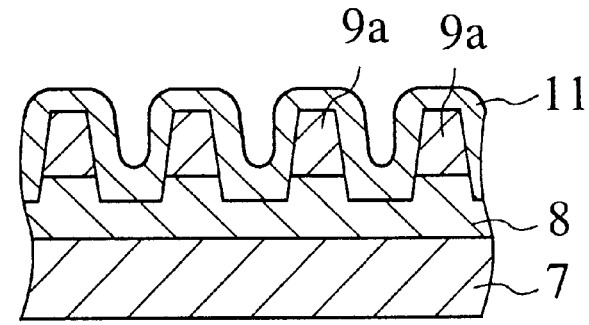

Then, a thin second cladding layer 11 is formed over the optical waveguide channels 9a and the groove portions of the first cladding layer 8 as shown in FIG. 7D to complete the formation of the waveguide array 3.

In the waveguide array 3 so fabricated, there is an air gap in the groove between the adjacent optical waveguide channels 9a so that the optical coupling between the adjacent optical waveguide channels 9a pan be prevented. Here, as shown in FIG. 6, the spacing between the adjacent optical waveguide channels 9a for guiding the multiplexed or demultiplexed optical signals is narrower on the diffracted light incident surface side 12, and widened so gradually that the optical loss due to the bending can be ignorable, until it reaches a width at the optical fiber connecting surface side 13 which makes it easier to connect the single mode optical fiber array 4. By setting the mode field diameter of the optical waveguide channel 9a to be equal to the mode field diameter of the single mode optical fiber which is 10 $\mu$m, it is possible to improve the coupling efficiency, and it is preferable to set the thickness and the width of each optical waveguide channel to be about 8 $\mu$m.

In addition, by making the optical waveguide layer 9 to be the high refractive index layer, it is possible to reduce the thickness and the width of each optical waveguide channel down to about 5 to 6 $\mu$m, such that the confinement coefficient of the light with respect to the optical waveguide layer 9 can be increased, the mode field diameter of the optical waveguide channel 9a can be made smaller, and the optical waveguide channel spacing at the diffracted light incident surface side 12 can be narrowed to about 10 $\mu$m. In such a case, the core of the optical waveguide channel 9a can be enlarged to be equal to the mode field diameter of the optical fiber in a vicinity of the optical fiber connecting surface side is for the sake of the optical coupling with the optical fiber.

Next, another method for fabricating the waveguide array 3 used in the configuration of FIG. 6 will be described with references to FIGS. 8A to 8D. This fabrication method is applicable to a case in which the required waveguide channel spacing can be wider than that required in the fabrication method of FIGS. 7A to 7D.

Figure 8A:
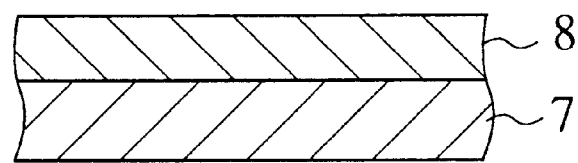
FIG. 8A to 8D are sequential illustrations of steps in another scheme for fabricating the waveguide array in the optical multiplexing and demultiplexing device of FIG. 6.

Namely, in this fabrication method, a first cladding layer 8 made of silica glass is formed on a silicon substrate 7 by the flame deposition method as shown in FIG. 8A.

Figure 8B:
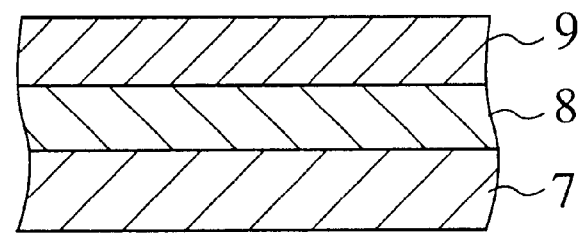

Then, an optical waveguide layer 9 made of silica glass doped with $TiO_2$ or GeO is formed over the first cladding layer 8 similarly by the flame deposition method as shown in FIG. 8B.

Figure 8C:
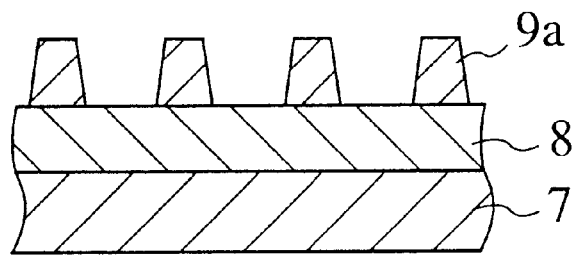

Then, the optical waveguide channels 9a are formed by applying the photolithography and the reactive ion etching on the optical waveguide layer 9 by using a suitable waveguide channel pattern as shown in FIG. 8C, so as to form a groove between each adjacent waveguide channels 9a.

Figure 8D:
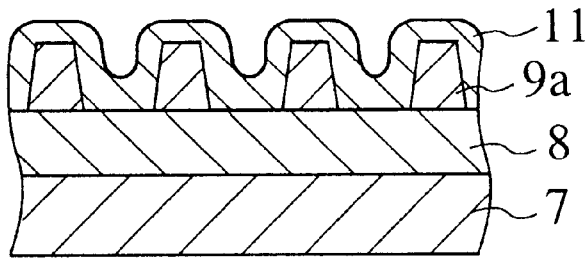

Then, a sufficiently thin second cladding layer 11 is formed over the optical waveguide channels 9a and the first cladding layer 8 as shown in FIG. 8D so as to make the cladding layer thickness between the adjacent optical waveguide channels 9a to be sufficiently thin. This completes the formation of the waveguide array 3 in which the optical coupling between the adjacent optical waveguide channels 9a can be prevented by the air gap in the groove between each adjacent waveguide channels.

It is also possible to fabricate the optical waveguide channels 9a by the ion exchange method. It is also possible to form the optical waveguide channels 9a first and then complete the waveguide array 3 by etching the groove between the adjacent optical waveguide channels 9a. For example, the Ti mask can be formed on the glass substrate by the photolithography, and this substrate is immersed into the heated nitrate such as $KNO_3$. As a result, the optical waveguide channels 9a are formed as the $K^+$ is diffused in the glass to increase the refractive index. Then, the groove is etched between the adjacent optical waveguide channels 9a so fabricated by the the reactive ion etching to complete the Waveguide array 3.

Figure 9A:
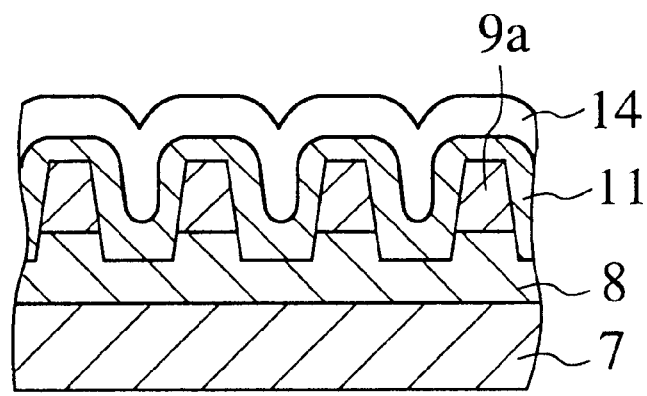
FIG. 9A and 9B are illustrations of modifications of the schemes for fabricating the waveguide array in the optical multiplexing and demultiplexing device of FIG. 6. corresponding to the scheme shown in FIGS. 7A to 7D, and the scheme shown in FIG. 8A to 8D, respectively.
Figure 9B:
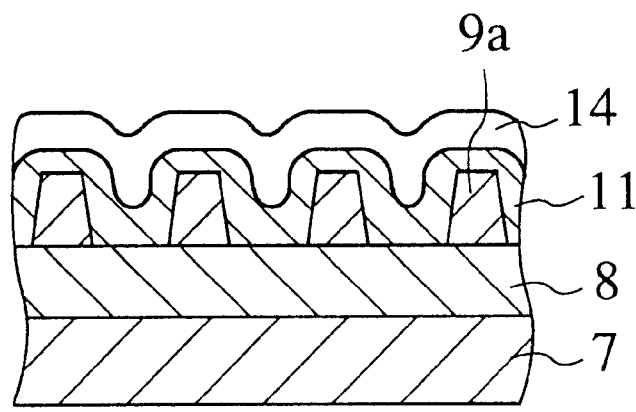

Also, as shown in FIGS. 9A and 9B, it is also possible to fill in the etching grooves by a layer 14 formed over the second cladding layer 11 which has a refractive index smaller than the cladding layers 8 and 11 instead of leaving the air gap in the etching grooves.

Moreover, in a case of narrowing the waveguide channel spacing further, the layer 14 shown in FIGS. 9A and 9B may be a layer which absorbs or reflects the lights for the purpose of preventing the optical coupling between the adjacent optical waveguide channels 9a. In this case layer 14 can be formed by the method for depositing InGaAs, InAsP, or AlInSb on the waveguide array by vaporization using a sputtering device for example. It is also possible to provide this layer which absorbs or reflects lights over a layer having a refractive index smaller than the cladding layer.

The effects of the waveguide array fabricated as described above are as follows.

In general, the optical signals incident on the diffraction grating are diffracted according to the relationship of the following equation (5).

$$\Lambda \cdot (\sin\alpha + \sin\beta) = \pm m \cdot \lambda \qquad (5)$$

where $\Lambda$ is the grating period, $\alpha$ is an incident angle of the incident optical signal, $\beta$ is a diffraction angle, m is an order of diffraction, and $\lambda$ is a wavelength of the optical signal. This equation (5) is the same as the equation (1) described above. On the other hand, the angle $\theta_B$ defined by the following equation (6) is called the blaze angle.

$$\alpha + \beta = 2 \cdot \theta_B \qquad (6)$$

In general, it is known that the blazed grating can concentrate the diffracted lights to a desired order of diffraction by fabricating the blazed grating with appropriate grating period $\Lambda$ and blaze angle $\theta_B$. In the conventional Littrow type device shown in FIG. 1, the diffraction angles $\beta$ are going to be, different for different optical wavelengths, so that the wavelength division multiplexed optical signals entered at the first port 48-1 are diffracted by the blazed grating 45 into different directions according to their wavelengths. Then, the lights of different wavelength channels are passed through the lens 46 again and coupled to different ports of the waveguide array 47 so as to realize the wavelength division demultiplexing function. Here, when the focal length of the lens 46 is f, the positional dispersion rate $dx/d\lambda$ of the diffracted light with respect to the wavelength is given by the following equation (7).

$$dx/d\lambda = f \cdot d\beta/d\lambda = m \cdot f/\Lambda \cdot \cos\beta \qquad (7)$$

This equation (7) is essentially the same as the equation (4) described above.

Now, when the focal, length f is increased, the resolution becomes higher and the transmission bandwidth of each signal with respect to the wavelength becomes narrower. Also, when the modulation speed of the signal becomes high speed, the spectrum width of the signal light becomes widened. Consequently, the increase of the focal length f lowers the sign transmission speed. In addition, it gives rise to the limitation on the tolerable wavelength variation level of the transmission light source or the optical multiplexing and demultiplexing device, so that the entire system becomes unstable.

However, there is also a limit to the shortening of the blazed grating period $\Lambda$, and practically it is up to about $1/1000$ $mm^{-1}$. In general, when the grating period $\Lambda$ is shortened, the large polarization dependency is caused in the diffraction efficiency characteristic with respect to the wavelength, such that it becomes inappropriate for use in the optical communication device. Therefore, the positional dispersion rate on the right hand side of the above equation (7) cannot be made larger in practice, but by using the waveguide array with narrow waveguide channel spacing, it becomes possible to realize a high resolution for the optical multiplexing and demultiplexing device as a whole.

More specifically, in a case the focal length f=25 cm, the diffraction grating period $\Lambda=1/300$ $mm^{-1}$, the order of diffraction m=2, the optical wavelength $\lambda=1.55$ $\mu$m (corresponding to the diffraction angle of 27.7°), in order to make the wavelength spacing $\delta\lambda$ to be less than 1 nm, it is necessary for the waveguide channel spacing to be less than 20 $\mu$m. However, in the conventional titanium diffused type waveguide, it is impossible to make the waveguide channel spacing as thin as less than several tens of $\mu$m because the field distribution of the lights propagating through the waveguide is wide and the narrowing of the waveguide channel spacing can cause the optical coupling among the waveguide channels.

In view of the above, in order to suppress the optical coupling among the waveguide channels, it is necessary to consider the distribution of the refractive index of the medium surrounding the waveguide. To this end, in this first embodiment, each waveguide is separated from the neighboring waveguides by an air gap (groove), or by a medium having a sufficiently smaller refractive index compared with that of the waveguide, or else by a layer for absorbing or reflecting the light, so as to secure the prevention of the optical coupling among the waveguide channels.

Figure 10:
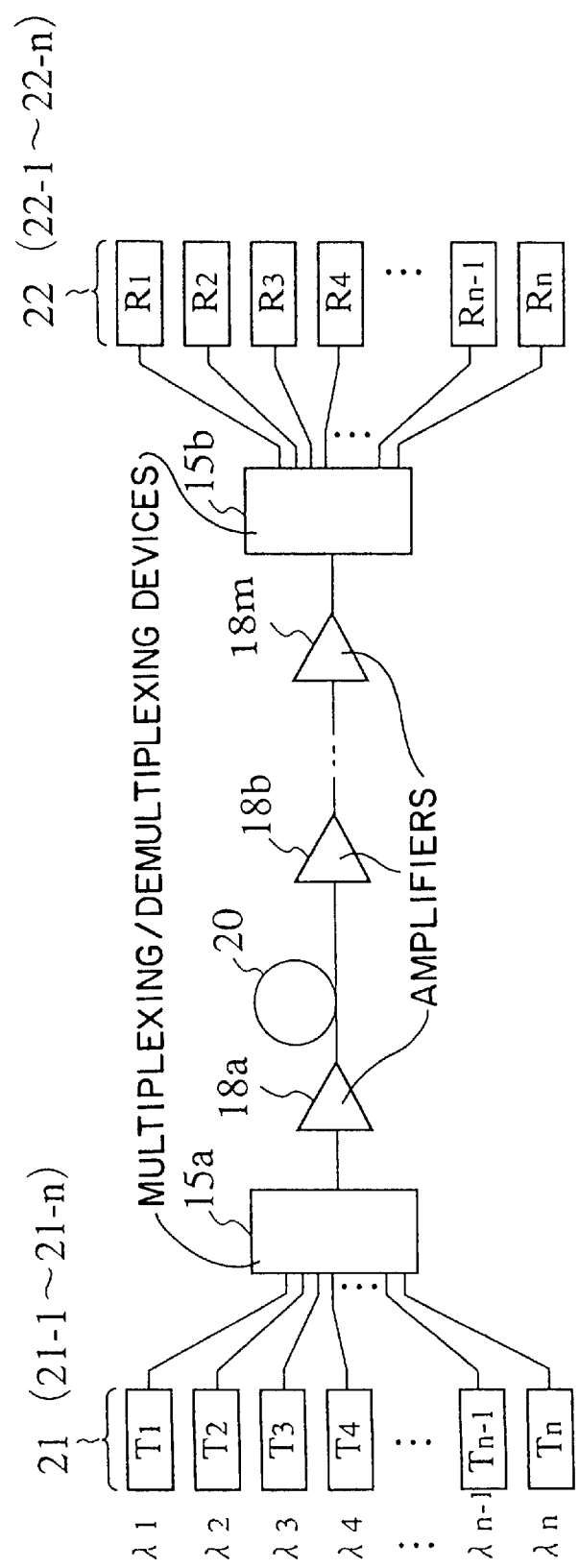
FIG. 10 is a schematic block diagram of one embodiment of an optical communication system utilizing the optical multiplexing and demultiplexing device of FIG. 6.

Referring now to FIG. 10, one embodiment of the wavelength division multiplexing optical communication system incorporating the above described first embodiment of the optical multiplexing and demultiplexing device will be described in detail.

In this embodiment, the system has a configuration shown in FIG. 10, which incorporates the optical multiplexing and demultiplexing devices 15 (15a and 15b) similar to that of FIG. 6, and in which the optical signals in various wavelength $\lambda 1$ to $\lambda n$ transmitted from optical transmitters 21 (21-1 to 21-n) are wavelength division multiplexed by the first optical multiplexing and demultiplexing device 15a, transmitted through the optical fiber 20 equipped with optical fiber amplifiers 18 (18-a to 18-m), wavelength division demultiplexed by the second optical multiplexing and demultiplexing device 15a, and received by optical receivers 22 (22-1 to 22-n).

Figure 11:
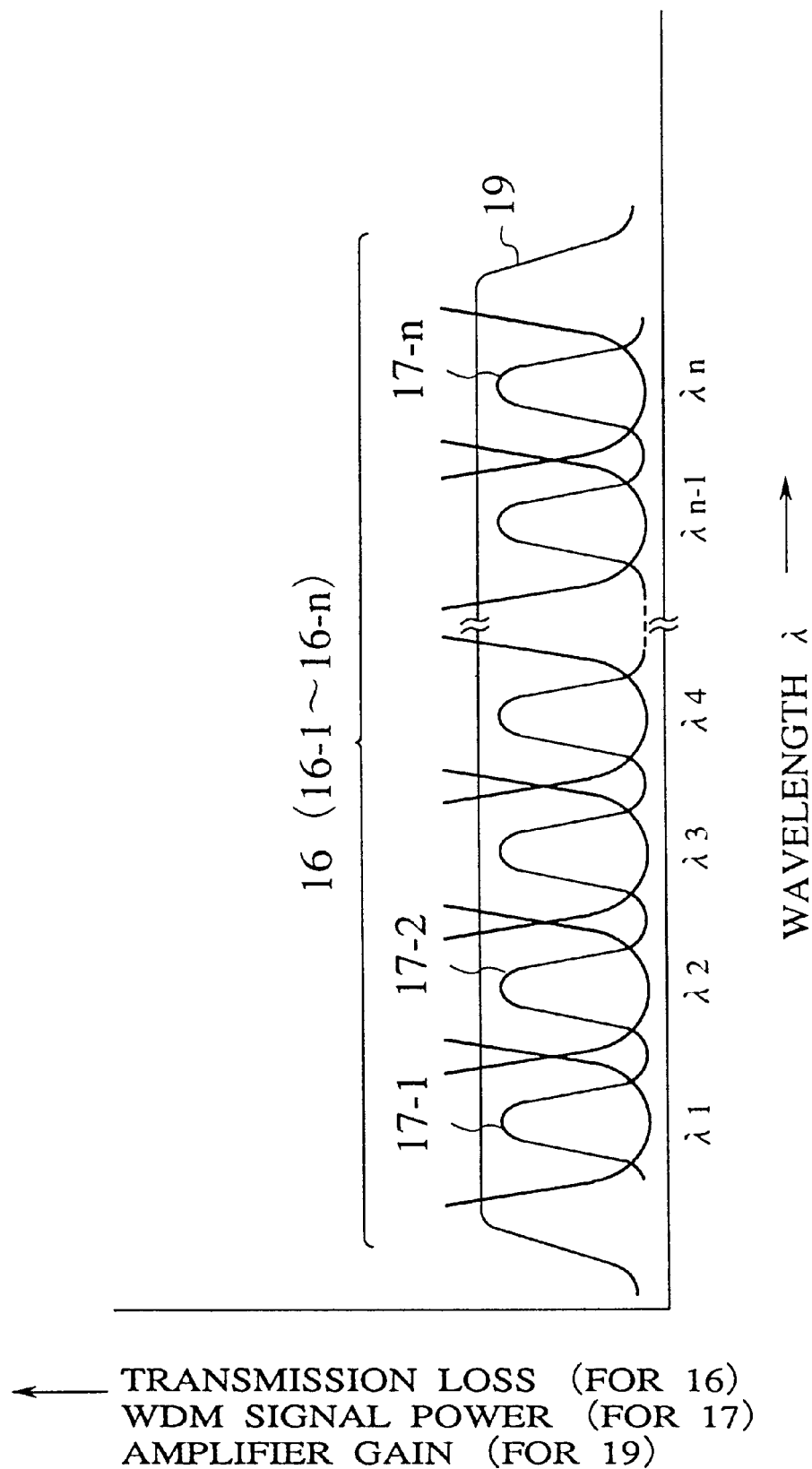
FIG. 11 is a graph of a transmission loss spectra in the optical communication system of FIG. 10.

Now, FIG. 11 shows the relationships of the transmission loss spectra 16 (16-1 to 16-n) of the optical multiplexing and demultiplexing devices 15 with respect to the power spectrum widths 17-1 to 17-n of the wavelength division multiplexed optical signals and the effective gain bandwidth 19 of the optical fiber amplifiers 18. Here, the power spectrum widths 17-1 to 17-n of the optical signals are largely dependent on the modulation scheme or the modulation rate used in generating the optical signals, and the fluctuation of their central wavelengths is mainly determined by the oscillation characteristic specific to the lasers used as the light sources. For this reason, the transmission bandwidth of the optical multiplexing and demultiplexing devices 15 corresponding to the optical signal of each channel is set to wider compared with the spectrum width of the optical signal of each channel, such that a sufficient margin can be provided which respect to the fluctuation of the central wavelengths of the optical signals.

Also, in order to increase the density of the wavelength division multiplexing, the wavelength spacing between the channels is narrowed by setting the transmission loss spectra 16 with respect to wavelengths to have steep gradient in each region outside of the transmission bandwidth of the optical multiplexing and demultiplexing devices 15. In addition, the wavelengths $\lambda 1$ to $\lambda n$ of the optical signals are to be placed within the effective gain bandwidth 19 of the optical fiber amplifiers 18. These requirements for the optical multiplexing and demultiplexing devices 15 can be satisfied by the appropriately fabricated configuration of FIG. 6 described above.

Thus, by incorporating the optical multiplexing and demultiplexing devices 15 according to the first embodiment described above into the system of FIG. 10, it becomes possible to transmits the large capacity data on one optical fiber 20 when the transmission speed per channel is sufficiently fast. It is also possible use the semiconductor laser array or the photo-diode array instead of the optical fiber array in this system of FIG. 10. In the former case, the system can also be utilized as a wavelength division multiplexed light source, and in the latter case, the system can also be utilized as a monitoring device for monitoring the light in each wavelength.

Figure 12:
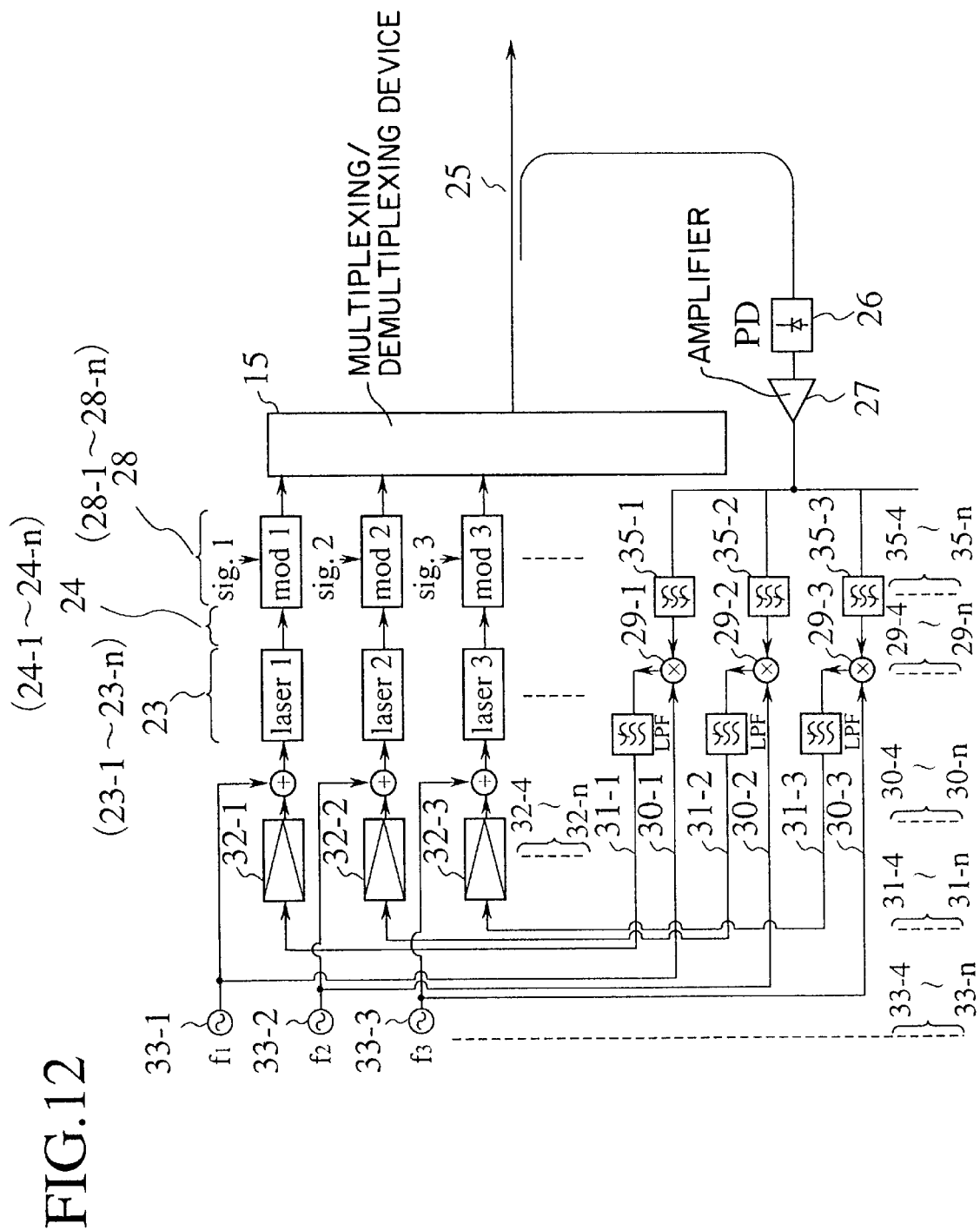
FIG. 12 is a block diagram of one embodiment of the optical transmission light source system utilizing the optical multiplexing and demultiplexing device of FIG. 6.

Referring now to FIG. 12, one embodiment of the optical transmission light source system incorporating the above described first embodiment of the optical multiplexing and demultiplexing device in order to stabilize the wavelengths of the transmission light sources by utilizing the optical characteristics of the optical multiplexing and demultiplexing device will be described in detail.

In this embodiment, the system has a configuration as shown in FIG. 12, which incorporates the optical multiplexing and demultiplexing deviates 15 similar to that of FIG. 6, and In which semiconductor lasers 23-1 to 23-n functioning as the light sources are supplied with injection currents from driver circuits 32-1 to 32-n which are weakly frequency modulated by using oscillators 33-1 to 33-n generating the modulation signals with mutually different oscillation frequencies f1 to fn, such that the output lights 24 (24-1 to 24-n) of the lasers 23-1 to 23-n are frequency modulated with small modulation indices. Here, the oscillation frequencies f1 to fn of the modulation signals are set to low frequency values in a range of several KHz to several tens of KHz Which are not used for the transmission. These output lights 24 are then intensity modulated by the signals to be transmitted (sig. 1, sig. 2, etc.) at the modulators 28 (28-1 to 28-n) and supplied to the optical multiplexing and demultiplexing device 15.

The wavelength division multiplexed lights multiplexed by the optical multiplexing and, demultiplexing device 15 are then partly taken out by a coupler 25, photo-electric converted by a photo-detector 26, and amplified by an amplifier 27, for the purpose of providing the wavelength stabilization loop. Then, the amplified lights are lead through band pass filters 35 (35-1 to 35-n) for transmitting only the frequencies f1 to fn, in order to remove the low frequency components within the loop bandwidth of the wavelength stabilization loop so as to improve the stability of the wavelength stabilization loop, and also in order to remove the unnecessary signals so as to improve the S/N ratio of the signals. The electric signals outputted from the band pass filters 35-1 to 35-n are then synchronously detected with the modulation signals 30-1 to 30-n generated by the oscillators 33-1 to 33-n at the multiplexers 29 (29-1 to 29-n), and the resulting outputs 31-1 to 31-n are fed back to the driver circuits 32-1 to 32-n of the semiconductor lasers 23-1 to 23-n through the low pass filters for preventing the abnormal oscillation within the loop.

Figure 13:
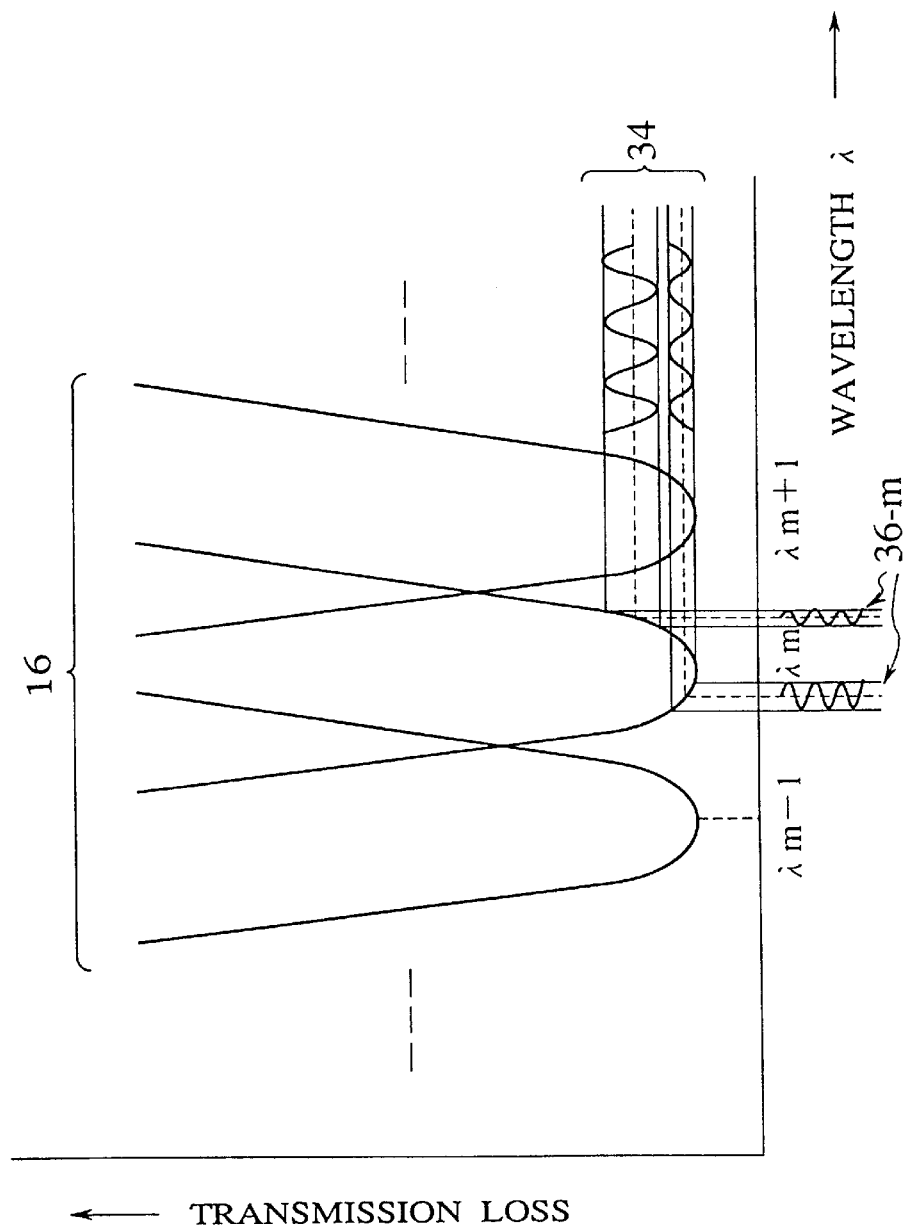
FIG. 13 is a graph of a transmission loss spectra in the optical transmission light source system of FIG. 12.

Now, FIG. 13 shows the relationship of the transmission loss spectra 16 of the optical multiplexing and demultiplexing device 15 and the frequency modulated signals. Here, the intensity modulation depth of the transmission light 34 is changed according to the position of the central wavelength $\lambda m$ of the frequency modulated signal 36-m, and the intensity modulation depth becomes minimum when the central wavelength $\lambda m$ of the frequency modulated signal is located at the maximum transmission point of the optical multiplexing and demultiplexing device, 15. Whether the central wavelength is located to the left or to the right of the maximum transmission point on the wavelength axis can be detected according to the phase relationship of the transmission light 34 and the frequency modulated signal 38-m, i.e., whether their phases are identical or opposite. In the configuration of FIG. 12, the laser output lights 24 functions as the frequency modulated signal 36-m of FIG. 13 while the wavelength division multiplexed lights outputted from the optical multiplexing and demultiplexing device 15 functions as the transmission light 34 in FIG. 13.

Therefore, when the controlling to make the intensity amplitude of the transmission light to be minimum is carried out by utilizing the transmission characteristic of the optical multiplexer and demultiplexer 15, it is possible to stabilize the wavelengths of a plurality of transmission lights collectively to the ideal wavelengths for which the multiplexing loss is minimum.

Here, by providing another optical multiplexing and demultiplexing device of FIG. 6 as a demultiplexer and supplying a part of the optical signal taken out by the coupler 25 as its input to detect the position of the light output port and its output intensity for each wavelength separately, it is possible to confirm whether the oscillation wavelength of each laser is at the desired wavelength or not.

Also, the modulation in frequencies f1 to fn can be utilized for the signal detection at each wavelength in the optical repeater. Namely, when the frequency modulation is applied to the semiconductor laser, the intensity modulation is also applied at the said time. For this reason, the optical repeater can detach the signal components of f1 to fn by photo-electric converting a part of the optical signal at a photo-detector, and frequency analyzing the obtained electric signal. In a case each component has a prescribed intensity, it can be judged that each signal has been delivered to the destination. It is also possible here to confirm each wavelength component by using the demultiplexer as described above.

Figure 14:
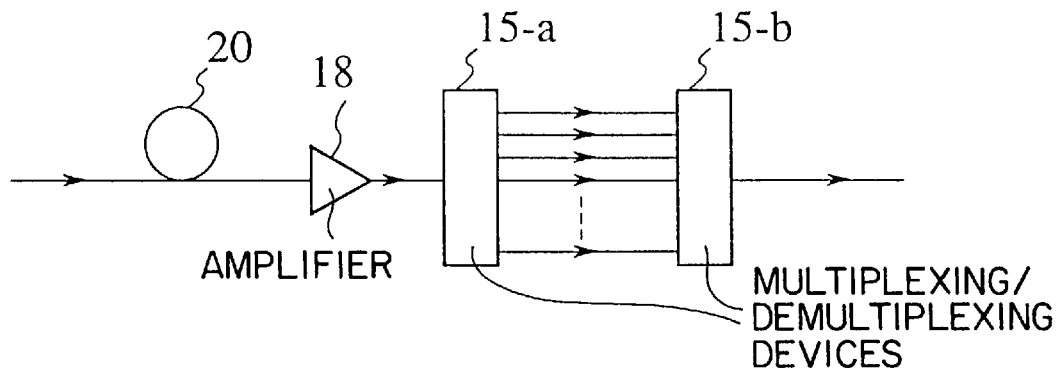
FIG. 14 is a schematic diagram of one embodiment of the optical transmission system utilizing the optical multiplexing and demultiplexing device of FIG. 6.

Referring now to FIG. 14, one embodiment of the optical transmission system incorporating the above described first embodiment of the optical multiplexing and demultiplexing device, which is directed tot the extension of the transmission distance will be described in detail.

In the long distance wavelength division multiplexed optical communication, the optical fiber amplifiers are connected in multiple stages in order to compensate the optical loss caused during the optical fiber transmission, and in this case the spontaneous emission light noises generated by the optical fiber amplifiers of the multiple stages are accumulated, so that there is a need to remove the spontaneous emission light in the transmission path. The spontaneous emission lights cause the noises in forms of the beat noise between the signal light and the spontaneous emission light, the beat noise between the spontaneous emission light, and the shot noise of the spontaneous emission light, which affect the system in addition to the shot noise of the signal lights. In order to compensate the optical loss in the optical fiber 20 which is the transmission path, there is a need to provide the optical fiber amplifiers 18 at constant spans in the transmission path as In the configuration of FIG. 10.

Here, the optical fiber amplifiers 18 generate the noises in forms of the spontaneous emission lights which have a wide bandwidth. Moreover, the spontaneous emission lights generated at different amplification stages make the mutual interaction which narrows the gain bandwidth of the optical fiber amplifiers 18. In the optical communication system not using the wavelength division multiplexing, the noises due to the spontaneous emission lights outside the signal bandwidth are removed by setting the transmission central wavelengths of the narrow bandwidth filters such as the dielectric multi-layer film filters to the central wavelengths of the optical signals. Similarly, in a case of the wavelength division multiplexing optical communication, especially In a case of the long distance transmission over several thousand km, a large amount of noises caused by the optical fiber amplifiers can be accumulated, so that there is a need to remove the noises due to the spontaneous emission lights by using the filter periodic with respect to the wavelengths.

Now, in the configuration of FIG. 14, two optical multiplexing and demultiplexing devices 15-a and 15-b of the identical characteristics in the configuration of FIG. 6 are Inserted in the transmission path such that the optical signals are demultiplexed by the first optical multiplexing and demultiplexing device 15-a, and then immediately multiplexed by the second optical multiplexing and demultiplexing device 15-b so as to realize the filtering with respect to the optical signal in each wavelength. At this point, the transmission bandwidth with respect to the optical signal in each wavelength at the second optical multiplexing and demultiplexing device 15-b is going to be relatively narrower than that at the first optical multiplexing and demultiplexing device 15-a, so that there is a need to design the optical multiplexing and demultiplexing devices 15-a and 15-b such that the composite transmission bandwidth of the two stages of the optical multiplexing and demultiplexing devices 15-a and 15-b does not becomes narrower than necessary.

Here, the periodic filter that can be utilized in the wavelength division multiplexing optical communication includes the Fabry-Pérot resonator and the Mach-Zehnder interferometer. In a case of the Fabry-Pérot resonator, the optical signals are optically stored up in the resonator so that the time delay can be given to a part of the optical signal. Consequently, when the optical signals are high speed ones, there is a need to avoid the influence of the time delay by the method for reducing the rate at which the optical signals are stored up in the resonators i.e., the Q value. In a case of the Mach-Zehnder interferometer, its wavelength-transmission characteristic is in sinusoidal shape so that the removal of the spontaneous emission light is reduced to about one half. Consequently, the noise removal efficiency is not large compared with the case of using two stages of the identical optical multiplexing and demultiplexing devices or the case of using, the Fabry-Pérot resonator, but there is an advantage that the relatively wide transmission bandwidth can be taken.

Figure 15:
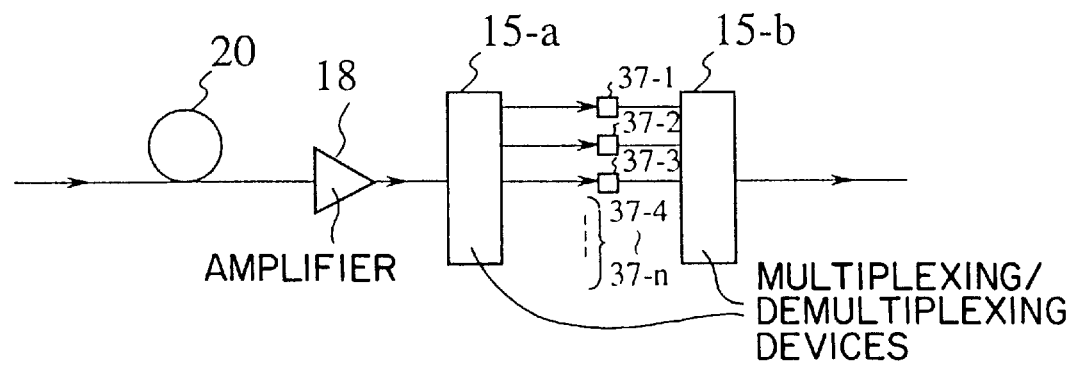
FIG. 15 is a schematic diagram of another embodiment of the optical transmission system utilizing the optical multiplexing and demultiplexing device of FIG. 6.

Referring now to FIG. 15, another embodiment of the optical transmission system incorporating the above described first embodiment of the optical multiplexing and demultiplexing device which is directed to the compensation of the wavelength dependency of the optical fiber amplifier will be described in detail.

When the optical fiber amplifiers 18 are connected in multiple stages, a large difference in the gain with respect to the wavelength can be caused. For this reason, there is a need for a device for adjusting the gain in the transmission path. In the configuration of FIG. 15, the optical transmission system of FIG. 14 described above which utilizes two stages of the optical multiplexing and demultiplexing devices 15-a and 15-b for reducing the noises due to the spontaneous emission lights is further modified to incorporate a plurality of attenuators 37-1 to 37-n on the optical fibers for transmitting signals in different wavelengths between these two optical multiplexing and demultiplexing devices 15-a and 15-b. The attenuation rates of the attenuators 37-1 to 37-n are set up such that the intensities of the signal lights in different wavelengths become equal at the receiving side. Here, the gain characteristic of the multiple stage optical fiber amplifiers does not change very much in time, but in view of the long term stability of the system, it is preferable for the attenuation rate of each attenuator 37 to be variable.

Figure 16:
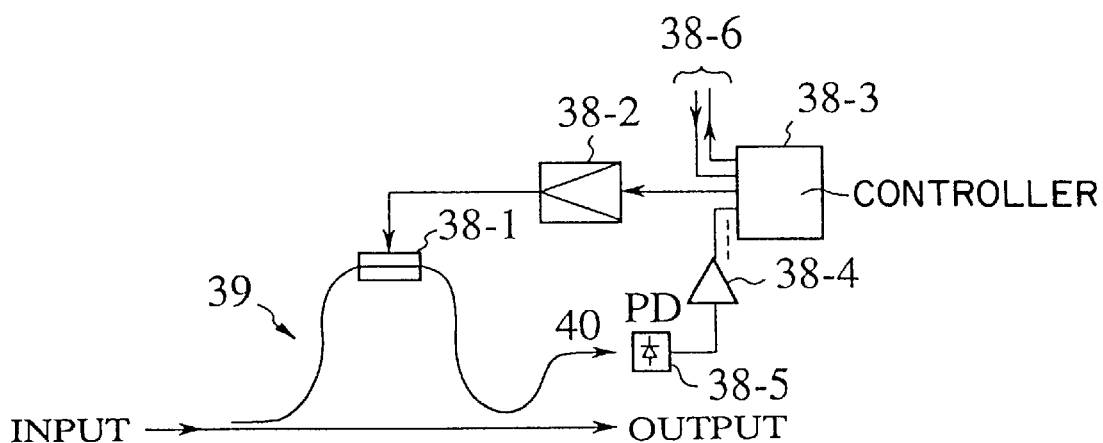
FIG. 16 is a schematic diagram of the Mach-Zehnder interferometer to be utilized in controlling the attenuation rates of the attenuators in the optical transmission system of FIG. 15.

More specifically, each attenuator 37 can be associated with the Mach-Zehnder interferometer 39 utilizing the thermo-optical effect as shown in FIG. 16, in which the intensity of a part 40 of the signal light in each wavelength is monitored and the appropriate attenuation rate is determined. Here, the configuration of FIG. 16 includes a optical path length changing heater 38-1 attached on the optical path of the Mach-Zehnder interferometer 39, a photo-detector 38-5 for detecting the part 40, an amplifier 38-4 for amplifying the output of the photo-detector 38-5, a heater drives circuit 38-2 for driving the optical path length changing heater 38-1, and an interferometer controller 38-3 for controlling the heater drive circuit 38-2 and generating control signals 38-6 for controlling each attenuator 37 according to the output of the amplifier 38-4.

Figure 17:
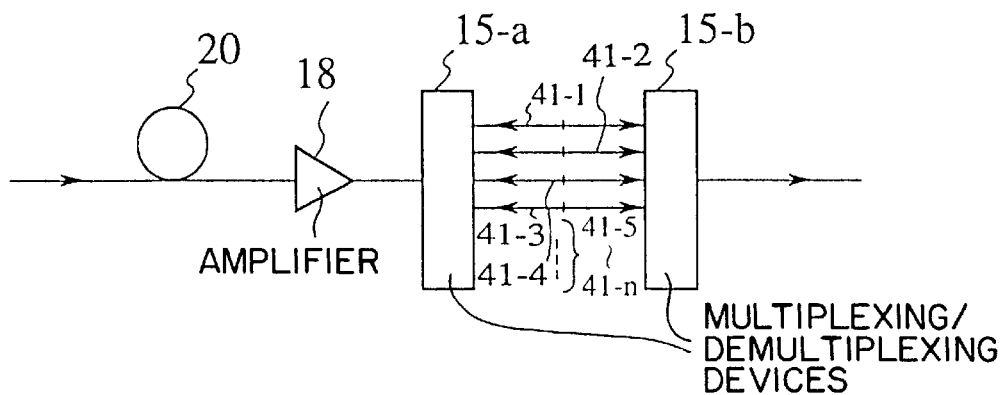
FIG. 17 is a schematic diagram of another embodiment of the optical transmission system utilizing the optical multiplexing and demultiplexing device of FIG. 6.

Referring now to FIG. 17, another embodiment of the optical transmission system incorporating the above described first embodiment of the optical multiplexing and demultiplexing device which is directed to the dispersion compensation for correcting the wavelength dispersiveness of the optical fiber amplifier will be described in detail.

In general, the optical signals propagated through the optical fiber for long distance have its pulse widths changed due to the wavelength dispersion of the optical fiber, and this gives rise to the limit for the transmission distance, so that in order to realize the long distance communication, there is a teed to compensate this dispersion.

Also, in a case the total optical intensity of the optical fiber input is large, the self-phase modulation phenomenon occurs due to the optical non-linear effect called the Kerr effect which changes the spectral distribution of the signal lights. In a case the dispersion value with respect to the signal light wavelength of the optical fiber is not equal to zero, and the optical fiber is that for a long distance over one thousand km, the spectral change due to the self-phase modulation gives rise to the distortion of the signal waveform through the wavelength dispersion. Then, the considerable adverse effect is exerted on the signal detection at the receiving side. Here, the dispersion value takes different values for the optical signals in different wavelengths. For this reason, in the wavelength division multiplexing optical communication, there is a need to take the different dispersion compensation for different optical signals of different wavelengths.

In the configuration of FIG. 17, the optical transmission system of FIG. 14 described above which utilizes two stages of the optical multiplexing and demultiplexing devices 15-$a$ and 15-$b$ is further modified to incorporate reciprocal dispersion optical fibers 41 (41-1 to 41-$n$) with different dispersion values for different wavelengths which give the dispersion in the opposite sign to the dispersion values with respect to the wavelength of each channel are provided between the optical multiplexing and demultiplexing devices 15-$a$ and 15-$b$ so as to realize the dispersion compensation.

Here, in a case the spread of the waveform due to the dispersion of each signal light is small and the total intensity of the wavelength division multiplexed lights is large, it is known that the noise light is going to be generated by the non-linear phenomenon called four wave mixing which is a kind of the non-linear optical effect in the optical fiber, and which lowers the S/N ratio of the signal when the wavelength of the noise light is judged to be close to the wavelength of the signal light. Therefore, in a case of inserting the dispersion compensation circuit in a middle of the transmission pat, there is a need to pay attention to make the output of the optical fiber amplifiers not excessively large, or else there is a need to take such a measure as to make the wavelength spacing of the optical signals unequal. In a case of making the wavelength spacing unequal, the waveguide channel spacing in the waveguide array should also be designed to be unequal. Thus, by using two stages of the optical multiplexing and demultiplexing devices of the identical characteristics, it becomes possibly to extend the transmission distance.

Figure 18:
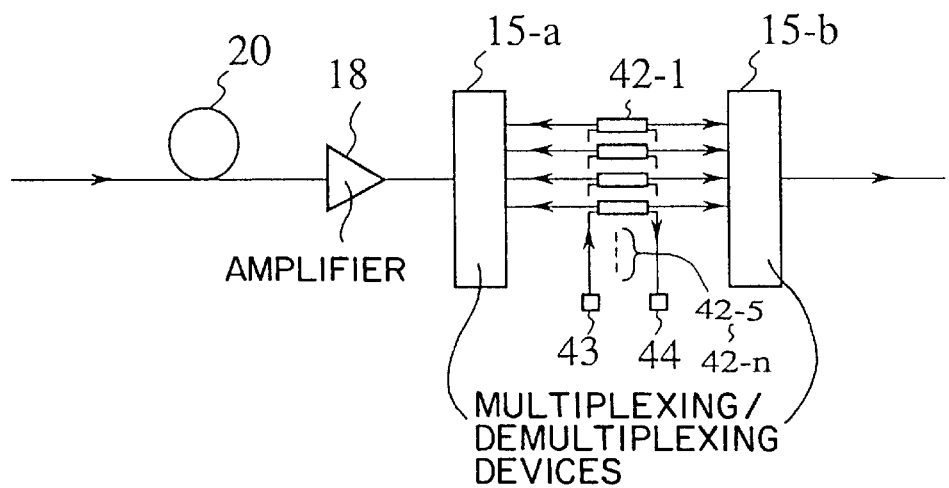
FIG. 18 is a schematic diagram of another embodiment of the optical transmission system utilizing the optical multiplexing and demultiplexing device of FIG. 6.

Referring now to FIG. 18, another embodiment of the optical transmission system incorporating the above described first embodiment of the optical multiplexing and demultiplexing device will be described.

In the configuration of FIG. 18, the optical transmission system of FIG. 14 described above which utilizes two stages of the optical multiplexing and demultiplexing devices 15-$a$ and 15-$b$ of the identical optical characteristic is further modified to incorporate 2 ×2 optical switches 42 (42-1 to 41-$n$) connected with an optical transmitter 43 on one side and an optical receiver 44 on the other side are provided between the optical multiplexing-and demultiplexing devices 15-$a$ and 15-$b$ to realize the ADD-DROP function in which the optical signal of the desired channel can be extracted and outputted selectively while the optical signals of the unnecessary channels are passed through. By providing this configuration of FIG. 18 at a location in each regional section of the transmission path, it becomes possible to distribute and collect the data at each regional section independently.

It is to be noted that a part or a whole of the configurations of FIGS. 14 to 18 may be combined together by connecting necessary elements such as the attenuators, the reciprocal dispersion optical fibers, the 2×2 optical switches, etc., in series between two optical multiplexing and demultiplexing devices 15-$a$ and 15-$b$. Here, the positions for inserting these optical multiplexing and demultiplexing devices and optical devices can be anywhere on the transmission path in principle, but in view of the S/N ratio, it is preferable to insert them immediately after the optical fiber amplifier.

As described, according to this first embodiment, the optical multiplexing and demultiplexing device having a high resolution and the transmission characteristic suitable for the high density wavelength division multiplexing optical transmission, without requiring a use of the diffraction grating with shorter diffraction grating period or the lens with a long focal length, so that the optical coupling among the waveguide channels in the waveguide array can be prevented surely and the satisfactory cross-talk removal characteristic among the neighboring channels can be obtained.

In addition, It is possible to utilize this optical multiplexing and demultiplexing device as the component of the device for suppressing the noises and the variation of gains of the optical amplifiers and extending the possible transmission distance. Moreover, it is also possible to utilize this optical multiplexing add demultiplexing device for stabilizing the wavelengths of the light sources in relation to the minimum loss of the optical multiplexing and demultiplexing device by a simple configuration, so as to realize the stable wavelength division multiplexing optical communication.

Figure 19:
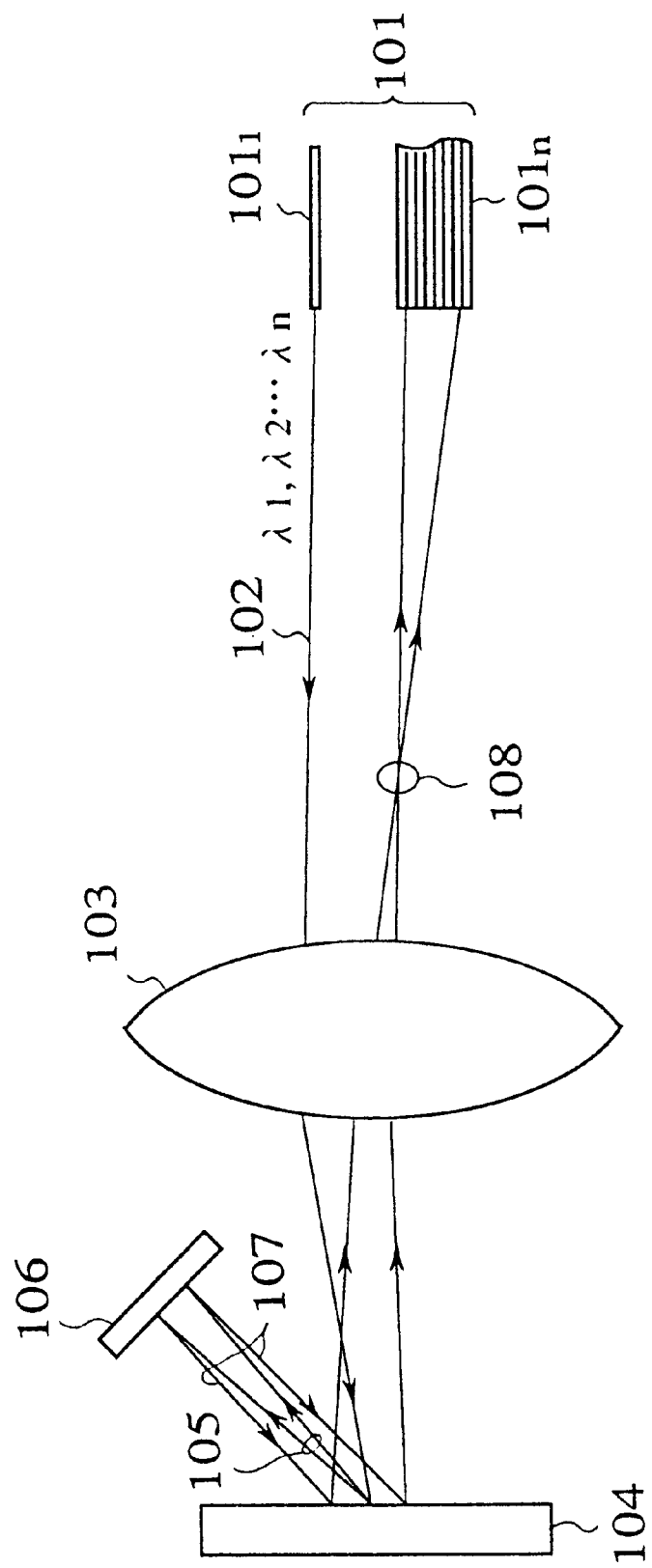
FIG. 19 is a schematic diagram of the second embodiment of the optical multiplexing and demultiplexing device according to the present invention.

Referring now to FIG. 19, the second embodiment of the optical multiplexing and demultiplexing device according to the present invention will be described.

In this second embodiment, the device has a schematic configuration as shown in FIG. 19, which comprises an optical fiber array 101 formed by a plurality of optical fibers $101_1$ to $101_n$, a lens 103, a diffraction grating 104, and a reflection mirror 106. In this configuration, the incident angle, the diffraction angle, and the angle of the reflection mirror 106 are in relationships as shown in detail in FIG. 20. The wavelength division multiplexed optical signals 102 emitted from an input port provided by one optical fiber $101_1$ of the optical fiber array 101 are collimated by the lens 103, lead to the diffraction grating 104 at the incident angle α, and diffracted by the diffraction grating 104. Then, the first diffracted lights $105_1$ to $105_n$ are reflected by the reflection mirror 106 and turned back to the diffraction grating 104, and diffracted by the diffraction grating 104 again such that the second diffracted lights constitute the wavelength division demultiplexed optical signals 108. These wavelength division demultiplexed optical signals 108 are collimated by the lens 103 again to different output ports provided by the optical fibers of the optical fiber array 101 and outputted through the optical fiber array 101.

Figure 20:
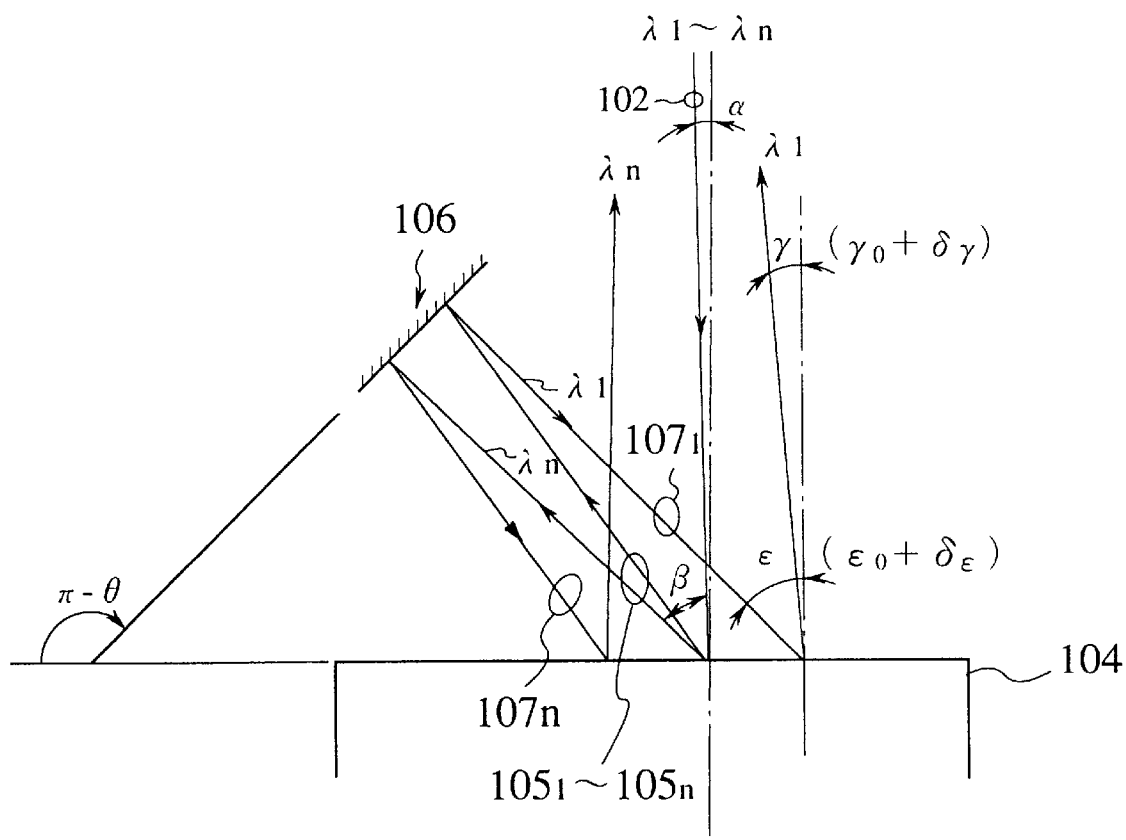
FIG. 20 is an enlarged view of lights in a vicinity of the diffraction grating in the optical multiplexing and demultiplexing device of FIG. 19.

Here, as shown in FIG. 20, the range of the utilized wavelength λ of the wavelength division multiplexed optical signals 102 is expressed as λθ±δλ and the change of the diffraction angle β of the diffracted lights $105_1$ to $105_n$ is expressed as β±δβ. Also, the ranges for changes of the incident angle ε of the returned diffraction lights 107 with respect to diffraction grating 104 and the diffraction angle γ of the second diffraction lights are expressed by εθ±δε and γ±δγ, respectively.

Then, assuming that the order id of diffraction is fixed to 1 alone, the first and second diffraction of the lights at the diffraction grating 104 can be expressed as follows.

$$\Lambda \cdot (\sin\alpha + \sin\beta) = \lambda \qquad (8)$$

for the first diffraction $$\Lambda \cdot (\sin\epsilon + \sin\gamma) = \lambda \qquad (9)$$

for the second diffraction $$\Lambda \cdot [\sin\alpha + \sin(\beta + \delta\beta)] = \lambda + \delta\lambda \qquad (10)$$

$$\Lambda \cdot [\sin(\epsilon + \delta\epsilon) + \sin(\gamma + \delta\gamma)] = \lambda + \delta\lambda \qquad (11)$$

Now, in a case of turning back the first diffraction lights 105 to the diffraction grating 104 again as described above, assuming that the propagation vectors of all the lights propagating among the structural elements (optical components) are located on the same plane, the incident angle $\epsilon$ of the optical signal with respect to the diffraction grating 104 ban be expressed by the angle $\theta$ between the reflection mirror 106 arid a reflection surface of the diffraction grating 104. and the diffraction angle $\beta$ for the first diffraction as follows.

$$\epsilon(\beta, \theta) = -(2 \cdot \theta + \beta) \qquad (12)$$

Then, by using the above equations (11) and (12), the wavelength dispersion relationship of the diffraction angle $\gamma$ for the second diffraction can be expressed as follows.

$$-A(\beta, \theta) \cdot |\delta\beta| + B(\beta, \theta) \cdot \delta\gamma = \delta\lambda \qquad (13)$$

where $$A(\beta, \theta) = \text{sgn}(\epsilon) \cdot \Lambda \cdot \cos\epsilon$$

$$B(\beta, \theta) = \text{sgn}(\sin^{-1}(\lambda/\Lambda - \sin\epsilon)) \cdot \Lambda \cdot \cos(\sin^{-1}(\lambda/\Lambda - \sin\epsilon))$$

and a function sgn() is defined as:

$$\text{sgn}(x) = \begin{cases} 1 & \text{for } X > 0 \\ -1 & \text{for } X < 0 \end{cases}$$

Also, by using the above equations (8) and (10) for the first diffraction, $\delta\lambda$ can be expressed in terms of $\delta\beta$ as follows.

$$\delta\lambda = \text{sgn}(\beta) \cdot \Lambda \cdot \cos\beta \cdot \delta\beta \qquad (14)$$

Then, the ratio of $\delta\gamma$ and $\delta\beta$ can be obtained from the above equations (13) and (14) as follows.

$$\delta\gamma/\delta\beta = \text{sgn}(\beta) \cdot (\Lambda \cdot \cos\beta + A) \cdot B^{-1} \qquad (15)$$

On the other hand, in the equation (2) described above as an equation for expressing the wavelength dispersion for the conventional Littrow type optical multiplexing and demultiplexing device, when the settings of m=1 and $\beta = \beta_L$ (diffraction angle for Littrow type) are substituted, the result is as follows.

$$\delta\beta_L \cdot \Lambda \cdot \cos\beta_L = \delta\lambda(2 \cdot \sin\beta_L = \lambda_B) \qquad (16)$$

Therefore, with respect to the wavelength displacement $\delta\lambda$, the ratio of the dispersion $\delta\beta$ of the diffraction angle $\beta$ in the optical multiplexing and demultiplexing device of FIG. 19 and the diffraction angle dispersion $\delta\beta_L$ of the conventional Littrow type optical multiplexing and demultiplexing device can be expressed as follows.

$$\delta\beta/\delta\beta_L = \cos\beta_L/\cos\beta \qquad (17)$$

Then, the ratio of the angle dispersions of the optical multiplexing and demultiplexing device of FIG. 19 and the conventional Littrow type optical multiplexing and demultiplexing device can be obtained by the product of the above equations (15) and (17) as follows.

$$\delta\gamma/\delta\beta_L = \cos\beta_L \cdot \text{sgn}(\beta) \cdot (\Lambda \cdot \cos\beta + A)/(B \cdot \cos\beta) > 1 \qquad (18)$$

Thus, this equation (18) implies $\delta\gamma/\delta\lambda > \delta\beta/\delta\lambda$ in the configuration of FIG. 19, and consequently, the value of this equation (18) is a parameter indicating the improvement of the resolution. For example, when the grating period $\Lambda$ is $\frac{1}{300}$ mm and the incident angle $\alpha$ is 0°, with respect to the optical signal with the wavelength 1.55 $\mu$m, the diffraction angle $\beta$ is going to be 27.7°, and when the angle $\theta$ of the reflection mirror is set equal to the Littrow diffraction angle $\beta_L = 13.4°$ for this same wavelength, the value of the equation (18) is 2.33.

When this is compared with the conventional Littrow type optical multiplexing and demultiplexing device using the grating period $\Lambda = \frac{1}{600}$ mm, the resolution is nearly the same (about 1.1 times higher in FIG. 19), so that the same resolution as the conventional device using the diffraction grating with the grating period twice as short can be achieved in the configuration of FIG. 19. Moreover, by adjusting the incident angle of the optical signal with respect to the diffraction grating, it is given possible to improve the resolution for more than four times in this configuration of FIG. 19.

In addition, this configuration of FIG. 19 can achieve the reduction of the polarization dependency as follows.

Namely, the grating period $\Lambda$ of the diffraction grating takes the value of the similar order as the wavelength of the lights, so that it, can be intuitively predicted that the stronger polarization dependency appears for the shorter grating period. Here, unlike the case of the spectroscope, the slight polarization dependency in the diffraction efficiency of the diffraction grating can cause the large fluctuation in the receiving level at the receiving side of the optical communication system to make the system unstable, so that it is highly desirable to eliminate the polarization dependency of tie optical multiplexing and demultiplexing device almost completely.

Figure 21:
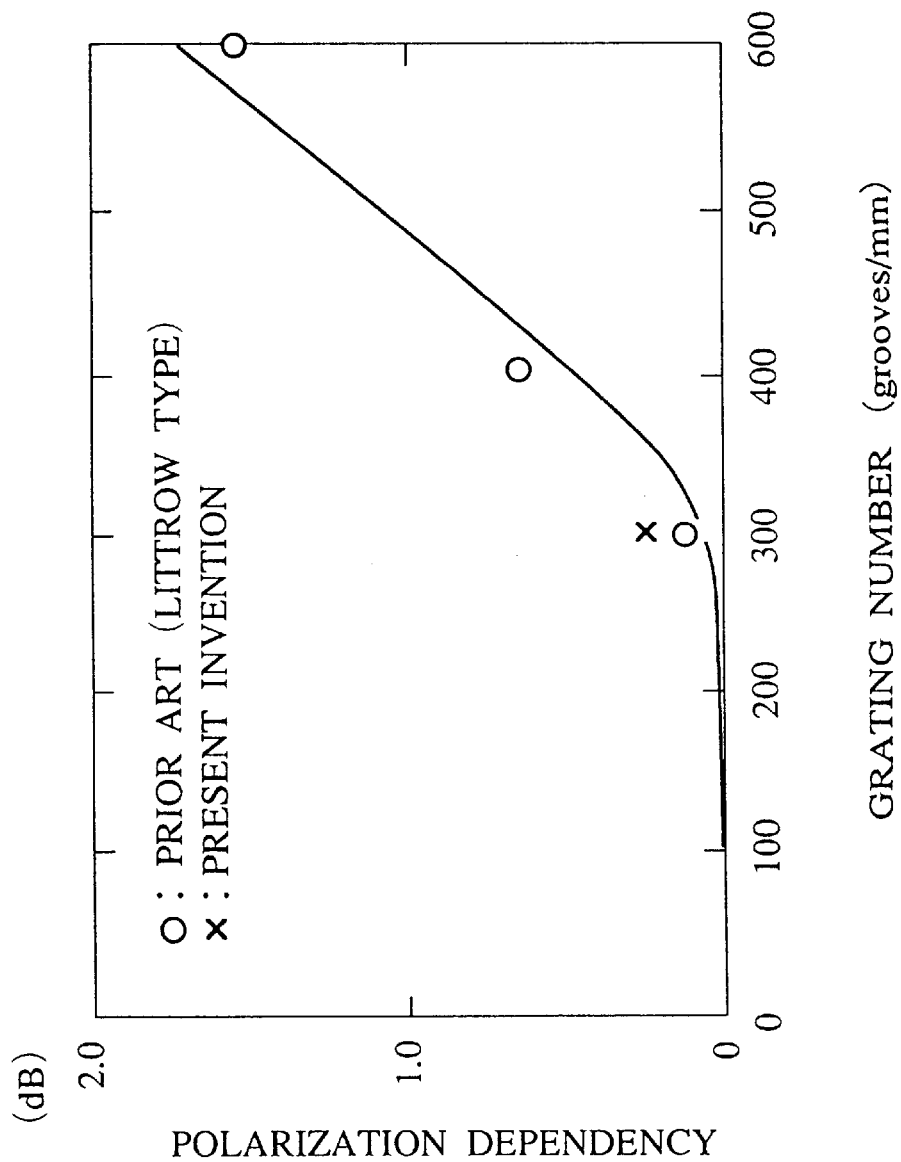
FIG. 21 is a graph of the polarization dependency versus the number of gratings in the optical multiplexing and demultiplexing devices of FIG. 19 and of the prior art.

The experimental result concerning tho polarization dependency of the diffraction grating is shown in FIG. 21, which indicates the polarization dependency (measured value) for a case of setting the lens, the optical fiber, and the diffraction grating in the arrangement of the conventional Littrow type device, by using three different diffraction grating with the grating periods $\Lambda = \frac{1}{300}$ mm, $\frac{1}{400}$ mm, and $\frac{1}{600}$ mm.

It can be seen frock this FIG. 21 that there is hardly any polarization dependency (less than 0.1 dB) in the multiplexing and demultiplexing characteristic of the diffraction grating with long grating period, but the polarization dependency becomes noticeable as the grating period becomes shorter, and reaches to as much as 1.6 dB in a case of the diffraction grating with the grating period of $\frac{1}{600}$ mm.

On the other hand, the polarization dependency of the configuration of FIG. 19 using the diffraction grating with the grating period of $\frac{1}{300}$ mm is as small as less than 0.4 dB. Thus, in this configuration of FIG. 19, when the grating period of the diffraction grating is made to be twice as long as that of the conventional device in order to suppress the polarization dependency, it is still possible to achieve the resolution which is more than twice higher than the conventional device, so that the improvement of the resolution and the polarization dependency can be achieved simultaneously.

Now, various specific configurations for this second embodiment of the optical multiplexing and demultiplexing device will be described in detail.

Figure 22:
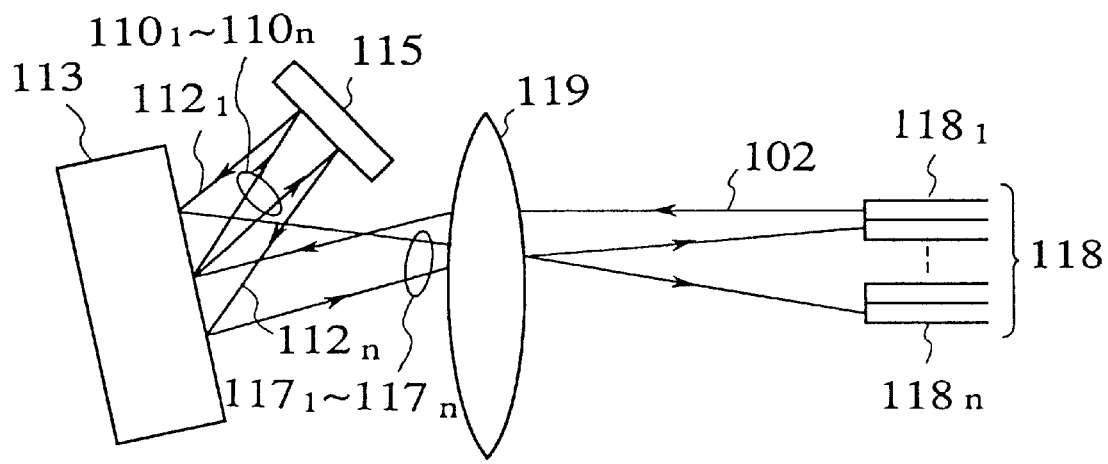
FIG. 22 is a first specific configuration of the second embodiment of the optical multiplexing and demultiplexing device according to the present invention.
Figure 23:
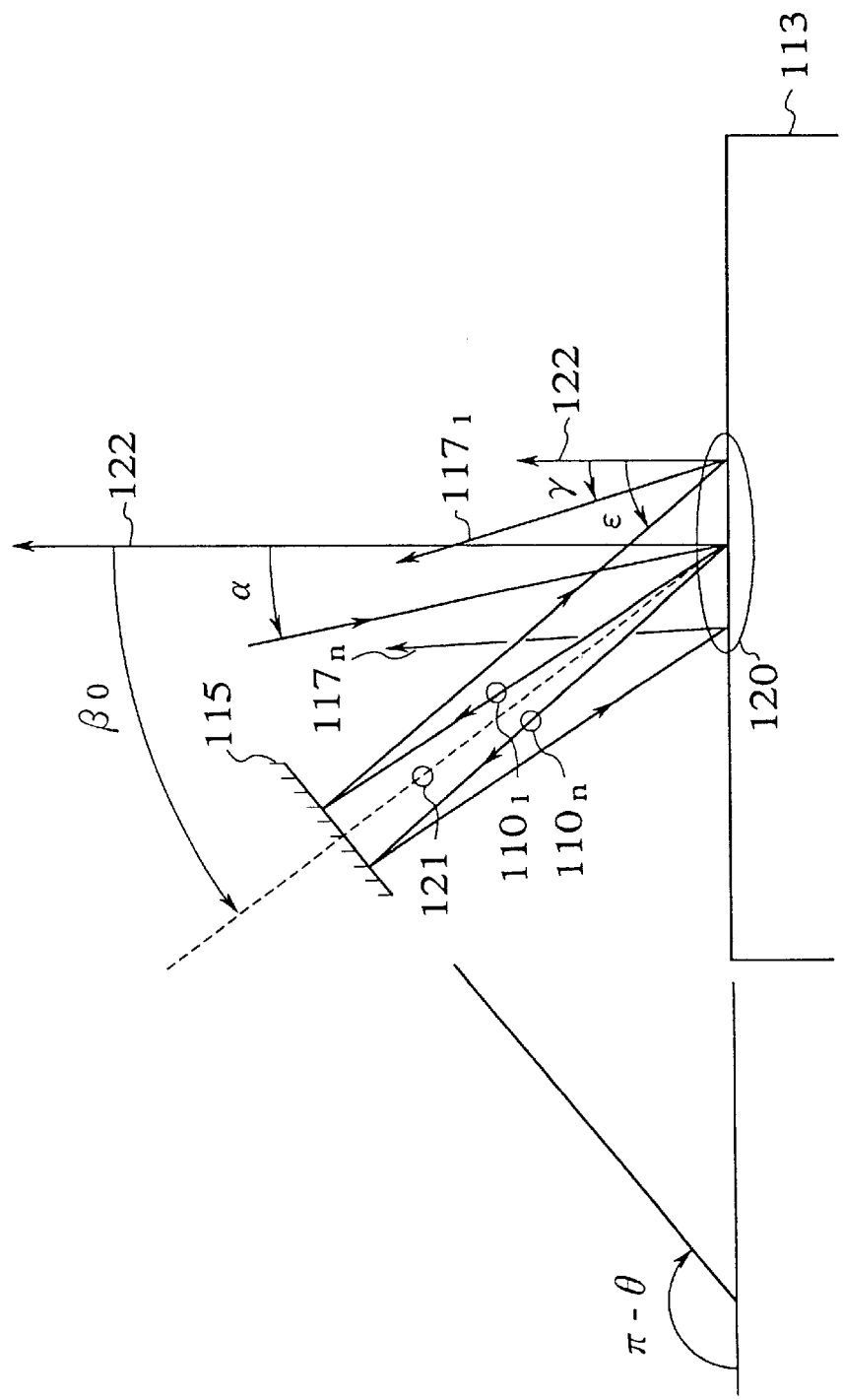
FIG. 23 is an enlarged view of lights in a vicinity of the diffraction grating in the optical multiplexing and demultiplexing device of FIG. 22.
Figure 24:
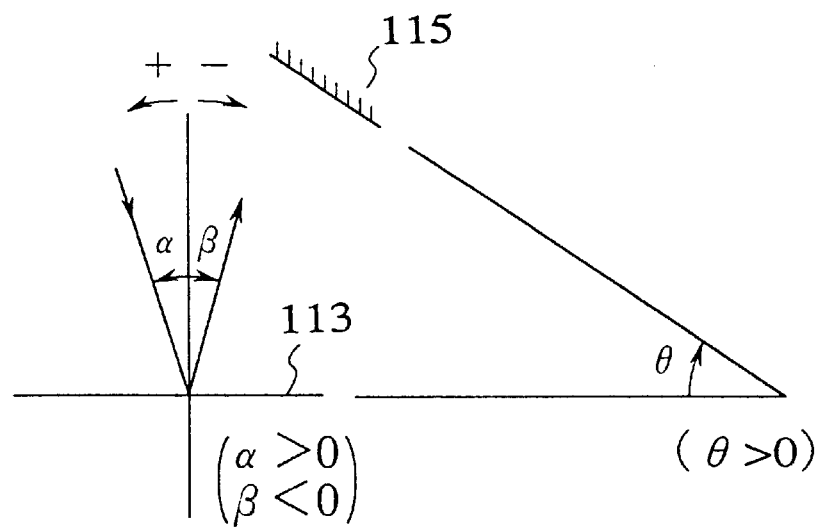
FIG. 24 is a diagram showing definitions of various angles in the optical multiplexing and demultiplexing device of FIG. 22.

FIG. 22 shows the first specific configuration, while FIG. 23 shows the relationships of the incident angle, the diffraction angle, and the angle of the reflection mirror in the configuration of FIG. 22, and FIG. 24 shows the definition of the signs for the incident angle, the diffraction angle, and the angle of the reflection mirror shown In FIG. 23.

This first specific configuration has a simplest configuration in which one reflection mirror is added to the conventional Littrow type configuration. Namely, this device of FIG. 22 comprises an optical fiber array 181 formed by a plurality of optical fibers $181_1$ to $181_n$, a lens 119 for collimating the wavelength division multiplexed optical signals 102 emitted from the optical fiber array 118, a reflective diffraction grating 113 for diffracting the collimated wavelength division multiplexed optical signals at the diffraction angles corresponding to their wavelengths, and a reflection mirror 115 for turning back the diffracted lights to the diffraction grating 113.

Here, the inclination and the position of the reflection mirror 115 are set as described above in conjunction with FIG. 19 such that the diffraction angles β of the first diffracted lights $110_1$ to $110_n$ are different from the respective incident angles ε of the returning diffracted lights $112_1$ to $112_n$ turned back to the diffraction grating 113 by the reflection mirror 115.

As shown in FIG. 23, when the angle formed by the surface of the diffraction grating 113 and the surface of the reflection mirror 115 is θ, the incident angle ε of the returning diffracted lights $112_1$ to $112_n$ at the diffraction grating 113 are going to be 2θ-($β_B$±δβ) then the diffraction angles of the diffracted lights $110_1$ to $110_n$ are expressed as ($β_B$±δβ).

Here, in view of the coupling of the second diffracted lights $117_1$ to $117_n$ with the optical fiber array 118, it is preferable to set the incident angles (2θ-β) to be nearly equal to the central value $β_B$ of the first diffraction angles β, so that the reflection mirror 115 should be arranged to make θ=$β_B$. The reason for this is that, in order to reduce the aberration at the lens 119, it is preferable for the incident region 120 of the returning diffracted lights 112 on the diffraction grating 113 to be in a vicinity of the emitted positions of the first diffracted lights 110.

More specifically, the inclination of the reflection mirror 115 can be adjusted such that the central line 121 between the propagation vectors of the first diffracted light $110_1$ for the shortest wavelength signal and the first diffracted light 110n for the longest wavelength signal nearly coincides with the normal line 122 of the surface of the reflection mirror 115. For example, when the diffraction grating 113 has a pitch of 300 lines/mm, the utilized wavelength range of the wavelength division multiplexed optical signals is about 20 nm (at 1.55 μm bandwidth), and the incident angle α is 0°, the variation of the diffraction angles β corresponding to the wavelength variation of 1.55 μm±10 nm is going to be 27.7°±0.2'. In other words, in the high density wavelength division multiplexed optical communication with about 1 nm wavelength spacing, the variation of the diffraction angles β is very small.

Consequently, the wavelength division demultiplexed optical signals 117 which have been diffracted twice by the diffraction grating can be regarded as the paraxial rays sufficiently close to the optical axis of the lens 119, so that the aberration is small, even though it also on the depends on the distance between the reflection mirror 115 and the diffraction grating 113 and the distance between the diffraction grating 113 and the lens 119.

Here, in fixing the reflection mirror 115, it is necessary to determining the fixing angle and position such that the diffracted light nearly parallel to the normal line of the reflection mirror 115 does not couple to the input port $118_1$ of the optical fiber array 118 again after being diffracted twice.

Also, by using the diffraction grating with the small polarization dependency in the diffraction efficiency as described above, it is possible to apply this device of FIG. 22 to the long distance optical communication system.

Moreover, in this device of FIG. 22, the focal length of the lens 119 can be shorter as much as the wavelength-angle dispersion of the diffracted angles is increased by means of the diffraction grating 113 and the reflection mirror 115, so that the designing and the manufacturing of the lens 119 become easier, and the cost of the lens 119 can be reduced, while the size of the entire device can be made smaller so that it is advantageous from the viewpoint of the temperature characteristic. In addition, as the focal length becomes shorter, the coupling loss with respect to the optical fiber due to the aberration of the lens 119 can be suppressed.

Figure 25:
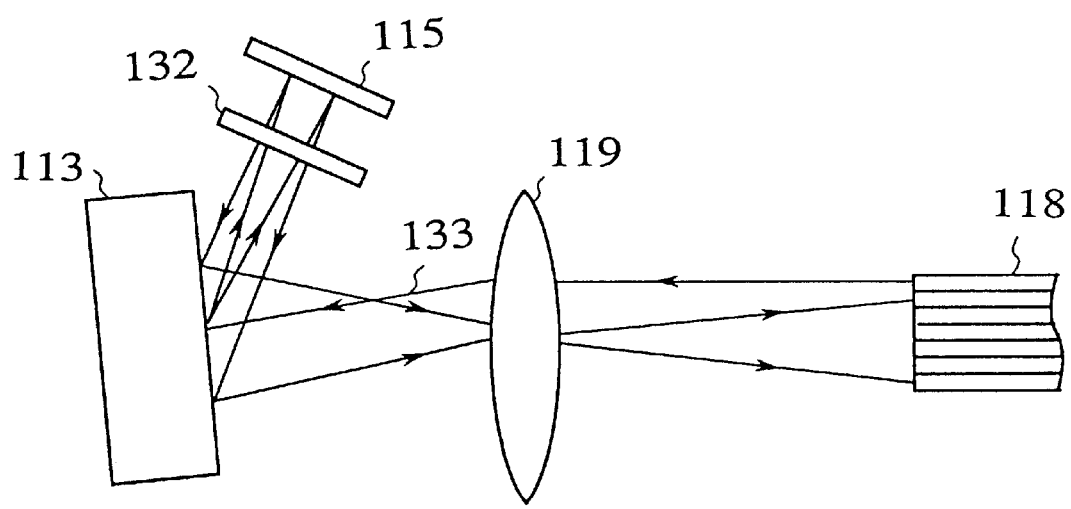
FIG. 25 is a third specific configuration of the second embodiment of the optical multiplexing and demultiplexing device according to the present invention.

Next. FIG. 25 shows the second specific configuration of this second embodiment, which differs from the first specific configuration of FIG. 22 in that ¼ wave plate 132 is provided on the optical path between the diffraction grating 113 and the reflection mirror 115. The other structural elements of this second specific configuration are substantially identical to those in FIG. 22.

In general, the diffraction efficiency, of the diffraction grating has the polarization dependency, which is a constant determined by the cross sectional shape and the grating period of the diffraction grating. In order to demultiplexing the wavelength division multiplexed lights with less than 1 nm wavelength spacing, the grating period of the same order as that of the wavelength of the lights is necessary, so that the polarization dependency of about several dB may appear.

In this second specific configuration of FIG. 25, the ¼ wave plate 132 is inserted between the diffraction grating 113 and the reflection mirror 115 such that the polarization state of the optical signals 133 at a time of the first incidence to the diffraction grating 113 and the polarization state of the returning optical signals at a time of the second incidence to the diffraction grating 113 are nearly perpendicular to each other.

Consequently, the total diffraction efficiency of the first and second diffraction for the optical, signals in an arbitrary polarization state can be roughly given by a product of the diffraction efficiency with respect to the polarization parallel to the plane depicted in FIG. 25 and the diffraction efficiency with respect to the polarization perpendicular to the plane depicted in FIG. 25, so that it is possible to eliminate the polarization dependency almost completely. Here, however, it is assumed that the direction of blazes of the diffraction grating is parallel to the plane depicted in FIG. 25.

On the other hand, the coupling loss and the polarization dependency at the reflection mirror 115 can be eliminated almost completely by using the dielectric multilayer film mirror as the reflection mirror 115.

In general, in the optical fiber communication, the polarization state of the optical signals propagating through the optical fiber changes quite sensitively in reaction to the change of the stress locally exerted on the optical fiber or the change of the temperature. For this reason, if the optical multiplexing and demultiplexing devices having not so small polarization dependency are used as they are in the long distance optical communication in an order of thousand km, the receiving level at the receiving side is going to fluctuate largely and the system is going to be unstable.

In this regard, the optical multiplexing and demultiplexing device in this second specific configuration has sufficiently small polarization dependency, so that it is effective in realizing the wavelength division multiplexing optical communication system which is stable with respect to the irregular polarization fluctuation of the optical signals that can be caused in the optical fibers.

It is to be noted that in this second specific configuration of FIG. 25, there is an insertion loss due to the insertion of the ¼ wave plate 132 compared with the first specific configuration of FIG. 22 used for the polarization state corresponding to the best diffraction efficiency, but in the long distance optical communication system, it is normal to employ the optical amplifiers for compensating the optical power loss in the optical fibers, and this insertion loss is negligible small compared with the gain of these optical amplifiers, so that this insertion loss is not going to cause any problem.

Figure 26:
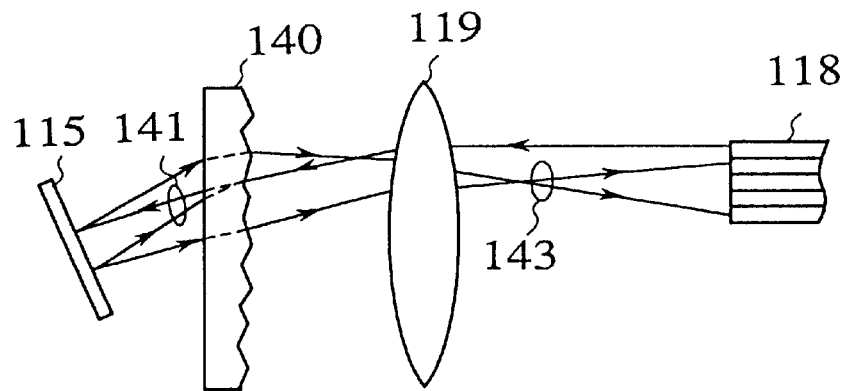
FIG. 26 is a fourth specific configuration of the second embodiment of the optical multiplexing and demultiplexing device according to the present invention.

Next, FIG. 26 shows the third specific configuration of this second embodiment, which differs from the first specific configuration of FIG. 22 in that a transmission type diffraction grating 140 is used and the reflection mirror 115 is provided behind this transmission type diffraction grating 140 to turn back the diffracted lights 141 transmitted behind the diffraction grating 140 and lead to the diffraction grating 140 again, so as to achieve the high resolution according to the same principle.

In the first and second specific configurations described above, it has been necessary to place the reflection mirror at a position which does not interfere with the optical path of the optical signals between the diffraction grating and the lens, but in this third specific configuration of FIG. 26, the reflection mirror 115 can be placed behind the diffraction grating 140, so that there is a greater freedom of choices for the position of the reflection mirror 115.

In addition, as it becomes possible to place the reflection mirror 115 behind the diffraction grating 140, it also becomes possible to shorten the distance between the diffraction grating 140 and the reflection mirror 115, such that the coupling loss of the output lights 143 with respect to the optical fiber array 118 can be reduced.

Moreover, by polishing the back side of the grating surface of the diffraction grating 140 at an appropriate angle by the optical surface polishing to form a reflective film, it is possible to omit the reflection mirror as a separate component, so that the number of device components can be reduced.

Furthermore, by using the substrate wish a small thermal expansion coefficient for the diffraction grating 140, it Is also possible to achieve the improvement of the temperature characteristic as well.

Figure 27:
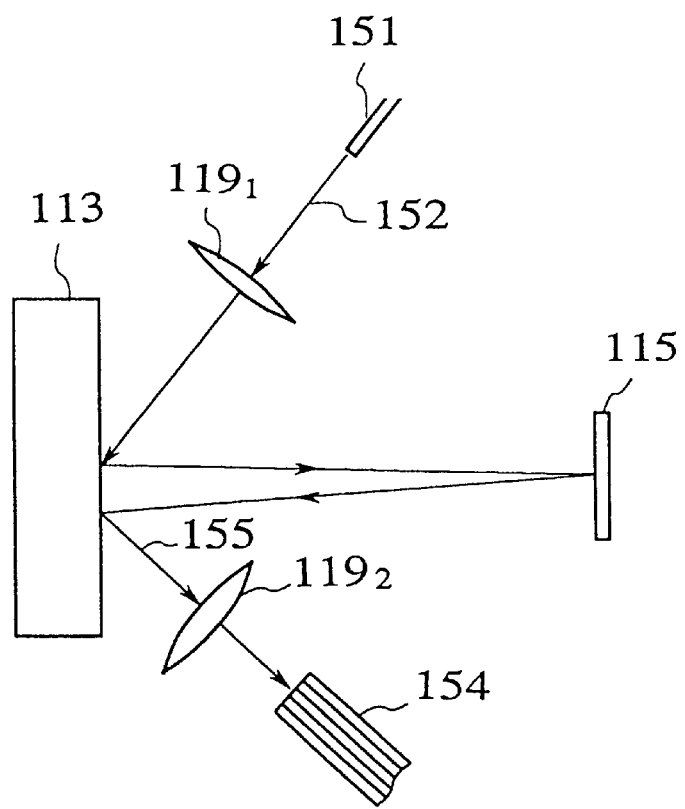
FIG. 27 is a fifth specific configuration of the second embodiment of the optical multiplexing and demultiplexing device according to the present invention.

Next, FIG. 27 shows the fourth specific configuration of this second embodiment, which is the optical multiplexing and demultiplexing device in the Czerny-Turner type incorporating the reflection mirror 115 similar to that used in the specific configurations described above, so as to achieve the high resolution according to the same principle.

In this fourth specific configuration of FIG. 27, the lens 119 for collimating the optical signals 152 emitted from the optical fiber 151 and the lens $119_2$ for coupling the second diffraction lights 155 with the optical fiber array 154 are provided separately, such that by adjusting the angles of the reflection mirror 115 and the diffraction grating 113 or the positions of the lens $113_1$ and the optical fiber array 154, it is possible to provide a greater freedom in choice of the setting ranges for the first incident angle α and the second diffraction angle γ compared with the Littrow type configuration of the above described specific configurations.

Here, the condition required for realizing the improvement of the resolution is that the term A in the above described equation (18) takes the positive value, and in this case, this condition can be satisfied when θ and β satisfies the the following relationship.

$$\beta + 2\cdot\theta > 0 \qquad (19)$$

Figure 28:
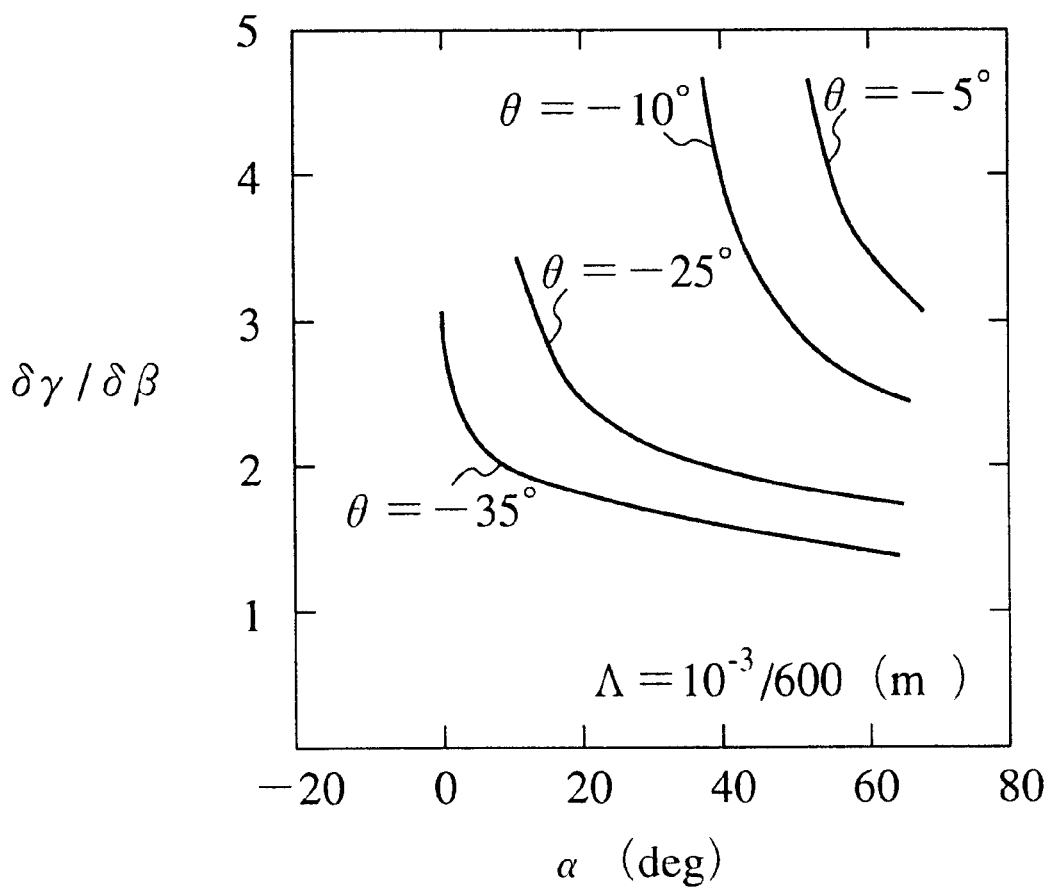
FIG. 28 is a graph of $\delta\gamma/\delta\beta$ with respect to the incident angle $\alpha$ for the configuration of FIG. 27.
Figure 29:
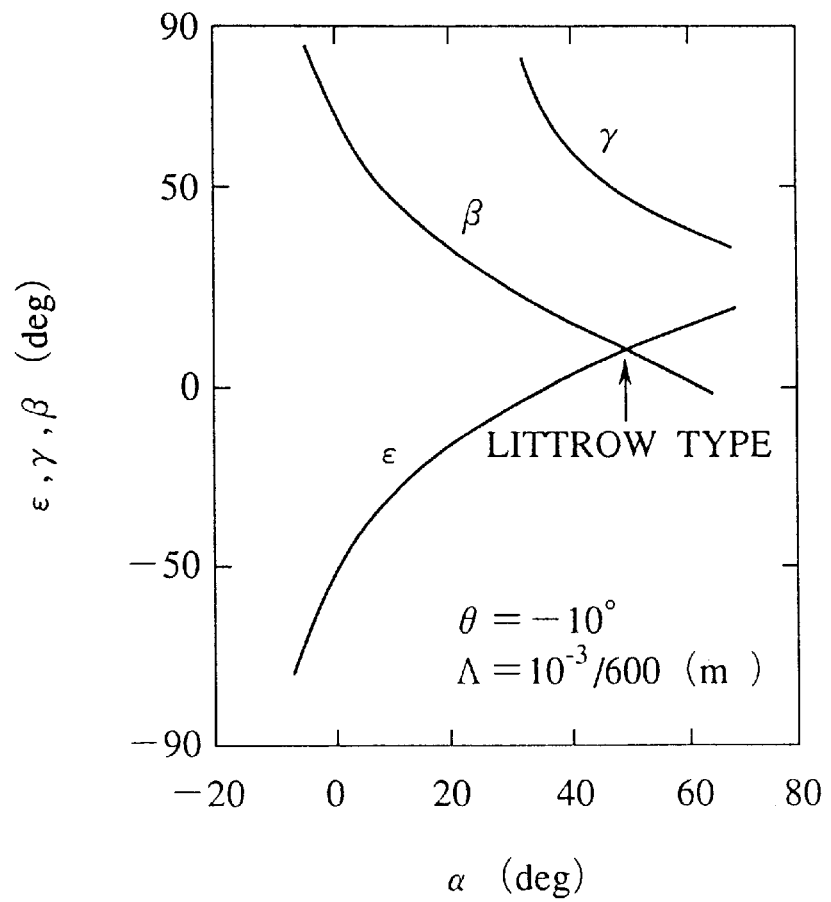
FIG. 29 is a graph of angles $\epsilon$, $\gamma$, and $\beta$ with respect to the incident angle $\alpha$ in the configuration of FIG. 27.

FIG. 28 shows the relationship between the incident angle α satisfying the above equation (19) and the angle dispersion ratio $\delta\gamma/\delta\beta_L$, and FIG. 29 shows the relationship between the incident angle α satisfying the above equation (19) and the angles (ε, γ, β). In FIG. 29, a region at which θ and −β becomes nearly equal is a region realizable by the Littrow type configuration, which the remaining region is a region realizable by the Czerny-Turner type configuration. Here, the actual range of the values for θ and β are more restricted than that allowed by the above equation (19) as the diffraction efficiency fluctuates according to the incident angle of the optical signals and the shape of the grating surface of the diffraction grating.

Figure 30:
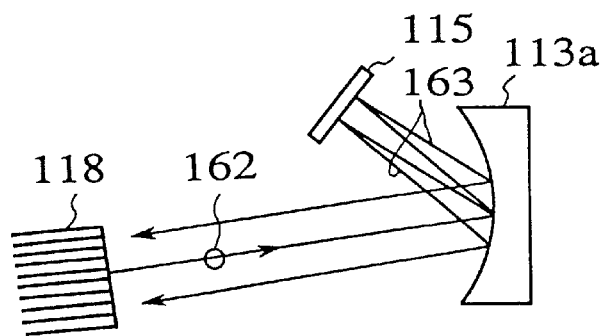
FIG. 30 is a sixth specific configuration of the second embodiment of the optical multiplexing and demultiplexing device according to the present invention.

Next, FIG. 30 shows the fifth specific configuration of this second embodiment, which uses the diffraction grating 113a having a concave reflection surface, where the curvature of the concave reflection surface is determined such that the optical signals 162 emitted from the optical fiber in the optical fiber array 118 are diffracted and collimated simultaneously. Consequently, no lens is needed in this fifth specific configuration, and therefore the device size can be reduced.

In addition, by setting the reflection mirror 115 such that the optical signals 163 diffracted and collimated by the diffraction grating 113a are turned back to the diffraction grating 113a by the reflection, mirror 115 at the second incident angle different from the first diffraction angle, it is possible to realize the high resolution optical multiplexing and demultiplexing device.

Thus, according to this fifth specific configuration, compared with the conventional Littrow type optical multiplexing and demultiplexing device, the optical multiplexing and demultiplexing device can be realized with at least the equivalent resolution and much more compact size.

It is to be noted here that the optical fiber array used in the above described embodiments as the optical transmission path array can be replaced by the other types of optical waveguide arrays such as those using silica glass or lithium niobate ($LiNbO_3$) to realize the optical multiplexing and demultiplexing device in the similar manner as described above.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical multiplexing and demultiplexing device comprising:

a waveguide array for entering optical signals to be multiplexed/demultiplexed, in a layered structure with a waveguide layer formed by silica glass and having a plurality of waveguide channels for propagating the optical signals, adjacent waveguide channels being separated by an etching groove formed therebetween in the waveguide layer, and means provided in at least a part of the etching grooves formed among the waveguide channels for preventing optical coupling among the waveguide channels;

a lens for collimating the optical signals from the waveguide array and the multiplexed/demultiplexed optical signals to the waveguide array; and a diffraction grating for diffracting the optical signals entered by the waveguide array and collimated by the lens to obtain wavelength division multiplexed/demultiplexed optical signals.

2. The device of claim 1, wherein the means for preventing optical coupling comprises an air gap provided in each etching groove.

3. The device of claim 1, wherein the means for preventing optical coupling comprises a coupling preventing layer having a refractive index lower than a cladding layer formed around the waveguide channels and which is provided in each etching groove.

4. The device of claim 3, further comprising a layer for absorbing/reflecting lights formed over the coupling preventing layer.

5. The device of claim 1, wherein the means for preventing optical coupling comprises a layer for absorbing/reflecting lights which is provided in each etching groove.

6. The device of claim 1, wherein the waveguide channels of the waveguide array are arranged at narrower spacings on one side of the waveguide array facing toward the lens and the diffraction grating, and at wider spacings on another side of the waveguide array facing toward an optical fiber array for transmitting the optical signals to and from the waveguide array.

7. The device of claim 1, wherein the waveguide array is fabricated by forming a first cladding layer and a waveguide layer on a substrate by a flame deposition method, selectively etching a part of the waveguide layer to form the waveguide channels as a remaining part of the waveguide layer, and then forming a thin second cladding layer over the first cladding layer and the waveguide layer by the flame deposition method, so as to leave the etching groove between each adjacent waveguide channels.

* * * * *